US008032348B2

(12) United States Patent
Mitrovic et al.

(10) Patent No.: US 8,032,348 B2
(45) Date of Patent: *Oct. 4, 2011

(54) SYSTEM AND METHOD FOR USING FIRST-PRINCIPLES SIMULATION TO FACILITATE A SEMICONDUCTOR MANUFACTURING PROCESS

(75) Inventors: Andrej S. Mitrovic, Phoenix, AZ (US); Eric J. Strang, Chandler, AZ (US)

(73) Assignee: Tokyo Electron Limited, Tokyo (JP)

( * ) Notice: Subject to any disclaimer, the term of this patent is extended or adjusted under 35 U.S.C. 154(b) by 732 days.

This patent is subject to a terminal disclaimer.

(21) Appl. No.: 10/673,138

(22) Filed: Sep. 30, 2003

(65) Prior Publication Data

US 2005/0071034 A1    Mar. 31, 2005

(51) Int. Cl.
*G06F 17/50* (2006.01)
*G06G 7/48* (2006.01)
*G06F 19/00* (2006.01)
*H01L 21/00* (2006.01)

(52) U.S. Cl. .................. 703/13; 703/7; 700/121; 438/5

(58) Field of Classification Search .................... 703/22, 703/13, 7; 716/2; 438/5; 700/121
See application file for complete search history.

(56) References Cited

U.S. PATENT DOCUMENTS

| | | | |
|---|---|---|---|
| 5,377,116 A | 12/1994 | Wayne et al. | |
| 5,526,293 A * | 6/1996 | Mozumder et al. | 700/109 |
| 5,539,652 A | 7/1996 | Tegethoff | |
| 5,583,780 A * | 12/1996 | Kee et al. | 700/117 |
| 5,629,877 A | 5/1997 | Tamegaya | |
| 5,719,796 A * | 2/1998 | Chen | 703/13 |
| 5,741,070 A | 4/1998 | Moslehi | |
| 5,866,437 A * | 2/1999 | Chen et al. | 438/14 |
| 6,185,472 B1 | 2/2001 | Onga et al. | |
| 6,198,980 B1 * | 3/2001 | Costanza | 700/99 |
| 6,263,255 B1 * | 7/2001 | Tan et al. | 700/121 |
| 6,304,834 B1 * | 10/2001 | Enda | 703/4 |
| 6,467,066 B2 | 10/2002 | Kusunoki | |
| 6,529,789 B1 | 3/2003 | Campbell et al. | |
| 6,560,503 B1 * | 5/2003 | Toprac et al. | 700/108 |
| 6,571,371 B1 * | 5/2003 | Coss et al. | 700/120 |

(Continued)

FOREIGN PATENT DOCUMENTS

CN    1335558 A    2/2002

(Continued)

OTHER PUBLICATIONS

"Emerging Paradigms in Semiconductor Manufacturing"; Paul P. Castrucci; 1990 Int'l Semiconductor Mfg. Science Symposium; IEEE 1990.*

(Continued)

*Primary Examiner* — Kamini S Shah
*Assistant Examiner* — Akash Saxena
(74) *Attorney, Agent, or Firm* — Oblon, Spivak, McClelland, Maier & Neustadt, L.L.P.

(57) ABSTRACT

A method, system and computer readable medium for facilitating a process performed by a semiconductor processing tool. The method includes inputting data relating to a process performed by the semiconductor processing tool and inputting a first principles physical model relating to the semiconductor processing tool. First principles simulation is then performed using the input data and the physical model to provide a first principles simulation result, and the first principles simulation result is used to facilitate the process performed by the semiconductor processing tool.

31 Claims, 14 Drawing Sheets

U.S. PATENT DOCUMENTS

| | | | |
|---|---|---|---|
| 6,581,029 B1 | 6/2003 | Fischer | |
| 6,587,744 B1* | 7/2003 | Stoddard et al. | 700/121 |
| 6,615,097 B2* | 9/2003 | Ozaki | 700/121 |
| 6,618,856 B2 | 9/2003 | Coburn et al. | |
| 6,625,497 B2 | 9/2003 | Fairbairn et al. | |
| 6,628,809 B1* | 9/2003 | Rowe et al. | 382/115 |
| 6,643,616 B1* | 11/2003 | Granik et al. | 703/13 |
| 6,728,591 B1* | 4/2004 | Hussey et al. | 700/121 |
| 6,757,645 B2* | 6/2004 | Chang et al. | 703/13 |
| 6,763,277 B1* | 7/2004 | Allen et al. | 700/100 |
| 6,774,998 B1* | 8/2004 | Wright et al. | 356/401 |
| 6,802,045 B1* | 10/2004 | Sonderman et al. | 716/2 |
| 6,810,296 B2* | 10/2004 | Bode et al. | 700/121 |
| 6,812,045 B1* | 11/2004 | Nikoonahad et al. | 438/14 |
| 6,905,895 B1* | 6/2005 | Coss et al. | 438/16 |
| 7,047,095 B2 | 5/2006 | Tomoyasu | |
| 7,055,112 B2* | 5/2006 | Kuznicki et al. | 716/102 |
| 7,107,571 B2* | 9/2006 | Chang et al. | 716/19 |
| 7,184,850 B1* | 2/2007 | Logsdon et al. | 700/121 |
| 7,333,871 B2* | 2/2008 | Schwarm | 700/121 |
| 7,356,377 B2* | 4/2008 | Schwarm | 700/121 |
| 7,622,308 B2* | 11/2009 | Hendler et al. | 700/121 |
| 2002/0032495 A1 | 3/2002 | Ozaki | |
| 2002/0107604 A1* | 8/2002 | Riley et al. | 700/121 |
| 2002/0180449 A1 | 12/2002 | Ushiku et al. | |
| 2003/0003607 A1 | 1/2003 | Kagoshima et al. | |
| 2003/0078738 A1* | 4/2003 | Wouters et al. | 702/22 |
| 2003/0101251 A1* | 5/2003 | Low | 709/223 |
| 2003/0135302 A1* | 7/2003 | Hung et al. | 700/245 |
| 2004/0044513 A1 | 3/2004 | Kitahara | |
| 2004/0058255 A1 | 3/2004 | Jessen et al. | |
| 2004/0078319 A1* | 4/2004 | Madhavan et al. | 705/38 |
| 2004/0102934 A1* | 5/2004 | Chang | 703/1 |
| 2005/0010319 A1* | 1/2005 | Patel et al. | 700/121 |
| 2005/0016947 A1* | 1/2005 | Fatke et al. | 216/2 |
| 2005/0071034 A1 | 3/2005 | Mitrovic | |
| 2005/0071035 A1 | 3/2005 | Strang | |
| 2005/0071036 A1 | 3/2005 | Mitrovic | |
| 2005/0071037 A1 | 3/2005 | Strang | |
| 2005/0071038 A1 | 3/2005 | Strang | |
| 2005/0071039 A1 | 3/2005 | Mitrovic | |

FOREIGN PATENT DOCUMENTS

| | | |
|---|---|---|
| EP | 0 718 595 A2 | 6/1996 |
| JP | 11-176906 | 7/1999 |
| JP | 2000-517473 | 12/2000 |
| JP | 2002-367875 | 12/2002 |
| JP | 2003-17471 | 1/2003 |
| JP | 2003-502771 | 1/2003 |
| JP | 2004-524685 | 8/2004 |
| JP | 2004-527117 | 9/2004 |
| JP | 2004-531878 | 10/2004 |
| JP | 2005-514790 | 5/2005 |
| JP | 2005-515623 | 5/2005 |
| JP | 2005-522018 | 7/2005 |
| KR | 1999-071784 | 4/1999 |
| WO | WO 02/07210 A2 | 1/2002 |
| WO | WO 02/065511 A2 | 8/2002 |
| WO | WO 02/069063 A2 | 9/2002 |
| WO | WO 03/009345 A2 | 1/2003 |
| WO | WO 03/058699 A1 | 7/2003 |
| WO | WO 03/060779 A1 | 7/2003 |

OTHER PUBLICATIONS

"Mathematic-Physical Engine: Parallel Processing for Modeling and Simulation of Physical Phenomena"; V.K.Jain et al; IEEE 1994.*

Mathematic-physical engine: parallel processing for modeling and simulation of physical phenomena Jain, V.K.;Parallel Architectures, Algorithms and Networks, 1994. (ISPAN) Dec. 14-16, 1994 pp. 366-373.*

Su-shing Chen, "AEMPES: An expert system for in-situ diagnostics and process monitoring" ; Semiconductor Manufacturing Science Symposium, 1990. ISMSS 1990., IEEE/SEMI International, May 21-23, 1990 pp. 119-122.*

"Modeling and Simulation," TheInternational Technology Roadmap for Semiconductors, 2001 Edition.

Tony C. Midea et al., 1999 Casting Simulation Software Survey, pp. 1-4.

Heru Setyawan, et al. "Visualization and numerical simulation of fine particle transport in a low-pressure parallel plate chemical vapor deposition reactor", Chemical Engineering Science 57 (2002) pp. 497-506.

Agam Shah, "Tilera Targets Intel, AMD With 100-Core Processor", PCWorld Solved, IDG News Oct. 26, 2009, pp. 1-3.

Robert W. Atherton, et al., "Detailed Simulation for Semiconductor Manufacturing", Proceedings of the 1990 Winter Simulation Conference, pp. 659-663.

Angus J. Macdonald, et al. "Integrating CAM and Process Simulation to Enhance On-Line Analysis and Control of IC Fabrication", IEEE Transactions on Semiconductor Conductor Manufacturing, vol. 3. No. 2, May 1990, pp. 72-79.

Yea-Huey Su, et al, "A Conceptual Framework for Manufacturng Service Provisioning by Virtual FABS", 1998 Semiconductor Manufacturing Technology Workshop, pp. 75-85.

Chanettre Rasmidatta, et al. "New Approaches for Simulation of Wafer Fabrication: The Use of Control Variates and Calibration Metrics", Proceedings of the 2002 Winter Simulation Conference, pp. 1414-1422.

Office Action issued Mar. 30, 2011 in Japanese Patent Application No. 10-2006-7006632, (with English-language Translation) pp. 1-17.

Naomi Yonemura, et al. "Heat Analysis on Insulated Metal Substrates", Proc. Of the 1994 IMC, 110 (1994), pp. 1407-1410.

Tony C. Midea, "1999 Casting Simulation Software Survey", AFS Process Design and Modeling Committee (1-F), David Schmidt, Finite Solutions, Inc., Arlington Heights, ILL pp. 1-4.

* cited by examiner

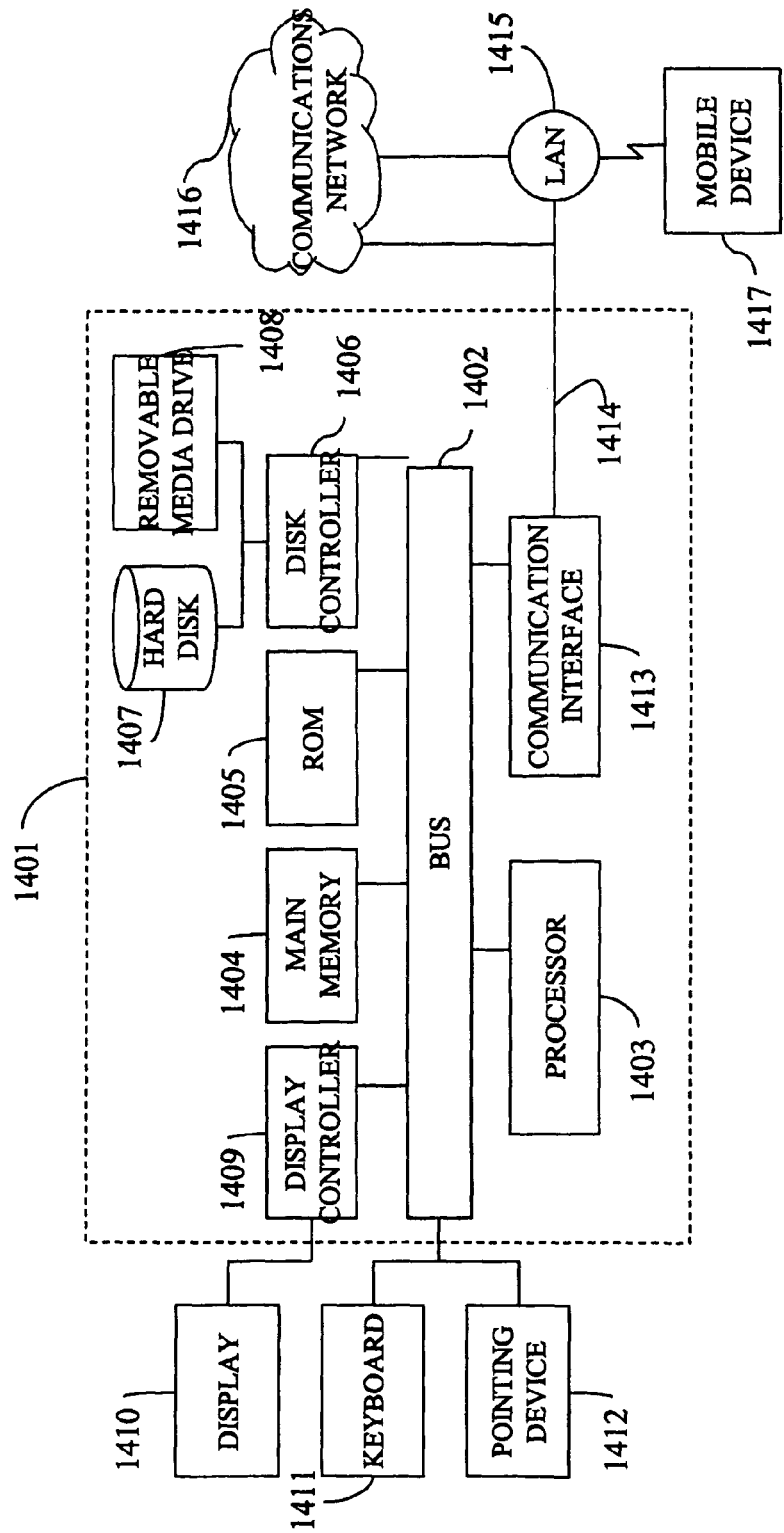

SYSTEM AND METHOD FOR USING FIRST-PRINCIPLES SIMULATION TO FACILITATE A SEMICONDUCTOR MANUFACTURING PROCESS

BACKGROUND OF THE INVENTION

1. Field of the Invention

The present invention relates generally to manufacturing semiconductor devices, and more specifically to use of first principles simulation in semiconductor manufacturing processes.

2. Discussion of the Background

Material processing in the semiconductor industry presents formidable challenges in the manufacture of integrated circuits (ICs). Demands for increasing the speed of ICs in general, and memory devices in particular, force semiconductor manufacturers to make devices smaller and smaller on the substrate surface. Moreover, in order to reduce fabrication costs, it is necessary to reduce the number of steps (e.g., etch steps, deposition steps, etc.) required to produce an IC structure and hence reduce the overall complexity of the IC structure and the fabrication methods thereof. These demands are further exacerbated by both the reduction in feature size and the increase of substrate size (i.e., 200 mm to 300 mm and greater) which places greater emphasis on the precise control of critical dimensions (CD), process rate, and process uniformity to maximize the yield of superior devices.

In semiconductor manufacturing, numerous steps during the evolution of ICs are employed including vacuum processing, thermal processing, plasma processing, etc. Within each processing step, numerous variables are present that affect the outcome of the process. In order to more precisely control the outcome of each processing step, the respective process tools are equipped with an increasing number of diagnostic systems (electrical, mechanical, and optical) to measure data during processing and provide an intelligent basis for correcting process variations through the actions of a process controller. The number of diagnostic systems is becoming burdensome and costly. Yet, data sufficiently resolved in space and time for complete process control is still not available.

These industry and manufacturing challenges have led to interest in more use of computer based modeling and simulation in the semiconductor manufacturing industry. Computer-based modeling and simulation are increasingly being used for prediction of tool performance during the semiconductor manufacturing tool design process. The use of modeling allows the reduction of both cost and time involved in the tool development cycle. Modeling in many disciplines, such as stress, thermal, magnetics, etc., has reached a level of maturity where it can be trusted to provide accurate answers to design questions. Moreover, computer power has been increasing rapidly along with the development of new solution algorithms, both of which resulted in reduction of time required to obtain a simulation result. Indeed, the present inventors have recognized that a large number of simulations typically done in the tool design stage can presently be run in times comparable to wafer or wafer cassette processing times. These trends have led to the suggestion that simulation capability typically used only for tool design can be implemented directly on the tool itself to aid in various processes performed by the tool. For example, the 2001 International Technology Roadmap for Semiconductors identifies issues impeding the development of on-tool integrated simulation capability as an enabling technology for manufacturing very small features in future semiconductor devices.

Indeed, the failure of industry to implement on-tool simulation to facilitate tool processes is primarily due to the need for computational resources capable of performing the simulations in a reasonable time. Specifically, the processor capabilities currently dedicated to semiconductor manufacturing tools are typically limited to diagnostic and control functions, and therefore could only perform relatively simple simulations. Thus, the semiconductor manufacturing industry has perceived a need to provide powerful dedicated computers in order to realize meaningful on-tool simulation capabilities. However, dedication of such a computer to the semiconductor processing tool results in wasted computational resources when the tool runs processes that use simple simulations, or no simulations at all. This inefficient use of an expensive computational resource has been a major impediment to implementation of simulation capabilities on semiconductor processing tools.

SUMMARY OF THE INVENTION

One object of the present invention is to reduce or solve the above identified and/or other problems of the prior art.

Another object of the present invention is to integrate first principles simulations capabilities with a semiconductor manufacturing tool in order to facilitate a process performed by the tool.

Yet another object of the present invention is to provide tool simulation capabilities without the need for powerful computational resources dedicated to the tool.

Still another object of the present invention is to provide broad based on-tool simulation capabilities using existing computational resources dedicated to each tool in a manufacturing facility.

These and/or other objectives may be provided by the following aspects of the invention:

According to a first aspect of the invention, a method of facilitating a process performed by a semiconductor processing tool includes inputting data relating to a process performed by the semiconductor processing tool and inputting a first principles physical model relating to the semiconductor processing tool. First principles simulation is then performed using the input data and the physical model to provide a first principles simulation result, and the first principles simulation result is used to facilitate the process performed by the semiconductor processing tool.

According to another aspect of the invention, a system includes a semiconductor processing tool configured to perform a process, and an input device configured to input data relating to the process performed by the semiconductor processing tool. A first principles simulation processor is configured to input a first principles physical model relating to the semiconductor processing tool, and perform first principles simulation using the input data and the physical model to provide a first principles simulation result. The first principles simulation result is used to facilitate the process performed by the semiconductor processing tool.

Yet another aspect of the invention is a system for facilitating a process performed by a semiconductor processing tool, which includes means for inputting data relating to a process performed by the semiconductor processing tool, and means for inputting a first principles physical model relating to the semiconductor processing tool. Also included in this aspect is means for performing first principles simulation using the input data and the physical model to provide a first principles simulation result, and means for using the first principles simulation result to facilitate the process performed by the semiconductor processing tool.

Still another aspect of the invention is computer readable medium containing program instructions for execution on a processor, which when executed by the computer system, cause the processor to perform the steps of inputting data relating to a process performed by a semiconductor processing tool, and inputting a first principles physical model relating to the semiconductor processing tool. The processor is also caused to perform first principles simulation using the input data and the physical model to provide a first principles simulation result, and use the first principles simulation result to facilitate the process performed by the semiconductor processing tool.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 14 illustrates a computer system upon which an embodiment of the present invention may be implemented.

DESCRIPTION OF THE PREFERRED EMBODIMENTS

Figure 1:
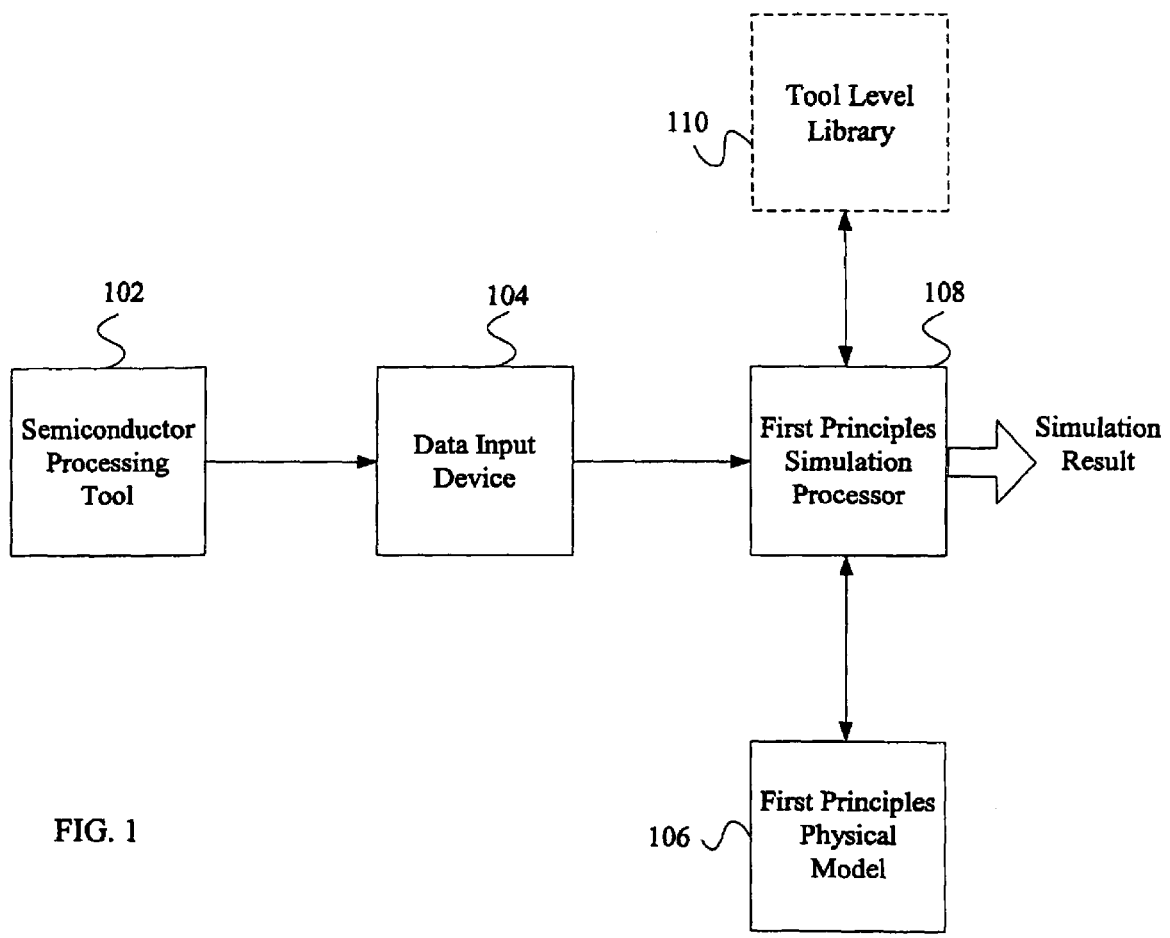
FIG. 1 is a block diagram of a system for using first principles simulation techniques to facilitate a process performed by a semiconductor processing tool in accordance with an embodiment of the present invention.

Referring now to the drawings, wherein like reference numerals designate identical or corresponding parts throughout the several views, FIG. 1 is a block diagram of a system for using first principles simulation techniques to facilitate a process performed by a semiconductor processing tool in accordance with an embodiment of the present invention. As seen in FIG. 1, the system includes a semiconductor processing tool 102, a data input device 104, a first principles physical model 106, and a first principles simulation processor 108. The system of FIG. 1 may also include a tool level library 110 as shown in phantom.

Semiconductor processing tool 102 is a tool for performing a process related to manufacturing an integrated circuit or semiconductor wafer. For example, the semiconductor processing tool 102 may be implemented as a material processing system, an etch system, a photoresist spin coating system, a lithography system, a dielectric coating system (i.e. a spin-on-glass (SOG) or spin-on-dielectric (SOD) system), a deposition system (i.e. a chemical vapor deposition (CVD) system or a physical vapor deposition (PVD) system), a rapid thermal processing (RTP) system for thermal annealing, a batch diffusion furnace, or any other tool for performing a semiconductor manufacturing process.

Data input device 104 is a device for collecting data relating to a process performed by the semiconductor processing tool 102 and inputting the collected data to the first principles simulation processor 106. The process performed by the semiconductor process tool 102 may be a characterization process (i.e. process design or development), a cleaning process, a production process, or any other process performed by the semiconductor processing tool. In one embodiment, the data input device 104 may be implemented as a physical sensor for collecting data about the semiconductor processing tool 102 itself, and/or the environment contained within a chamber of the tool. Such data may include fluid mechanic data such as gas velocities and pressures at various locations within the process chamber, electrical data such as voltage, current, and impedance at various locations within the electrical system of the process chamber, chemical data such as specie concentrations and reaction chemistries at various locations within the process chamber, thermal data such as gas temperature, surface temperature, and surface heat flux at various locations within the process chamber, plasma processing data (when plasma is utilized) such as a plasma density (obtained, for example, from a Langmuir probe), an ion energy (obtained, for example, from an ion energy spectrum analyzer), and mechanical data such as pressure, deflection, stress, and strain at various locations within the process chamber.

In addition to the tool and tool environment data, the data input device 104 may collect data relating to the process itself, or process results obtained on a semiconductor wafer that the tool 102 is performing a process on. In one embodiment, data input device 104 is implemented as a metrology tool coupled to the semiconductor processing tool 102. The metrology tool may be configured to measure process performance parameters such as: etch rate, deposition rate, etch selectivity (ratio of the rate at which a first material is etched to the rate at which a second material is etched), an etch critical dimension (e.g. length or width of feature), an etch feature anisotropy (e.g. etch feature sidewall profile), a film property (e.g. film stress, porosity, etc.), a mask (e.g. photoresist) film thickness, a mask (e.g. photoresist) pattern critical dimension, or any other parameter of a process performed by the semiconductor processing tool 102.

The data input device may be directly coupled to the process tool 102 and first principles simulation processor 106 to automatically receive data from the tool 102 and forward this data to the first principles simulation processor 106, as shown in FIG. 1. Alternatively, the data input device 104 may be implemented as a user input device used to indirectly provide data relating to a process performed by the semiconductor processing tool 102 to the simulation processor 106. For example, data input device 104 may be a keyboard that a simulation operator uses to input data into the first principles simulation processor 106. Still alternatively, the data input device may be a database for storing data relating to processes performed in the past by the semiconductor processing tool 102. In this embodiment, the database may be populated automatically by use of a physical sensor or metrology tool coupled to the semiconductor processing tool 102, and/or by manual input. The database may be automatically accessed by the first principles simulation processor 108 to input the data to the processor.

First principles physical model 106 is a model of the physical attributes of the tool and tool environment as well as the fundamental equations necessary to perform first principles simulation and provide a simulation result for facilitating a process performed by the semiconductor processing tool. Thus, the first principles physical model 106 depends to some extent on the type of semiconductor processing tool 102 analyzed as well as the process performed in the tool. For example, the physical model 106 may include a spatially resolved model of the physical geometry of the tool 102, which is different, for example, for a chemical vapor deposition (CVD) chamber and a diffusion furnace. Similarly, the first principles equations necessary to compute flow fields are quite different than those necessary to compute temperature fields. The physical model 106 may be a model as implemented in commercially available software, such as ANSYS, of ANSYS Inc., Southpointe, 275 Technology Drive Canonsburg, Pa. 15317, FLUENT, of Fluent Inc., 10 Cavendish Conn. Centerra Park, Lebanon, N.H. 03766, or CFD-ACE+, of CFD Research Corp., 215 Wynn Dr., Huntsville, Ala. 35805, to compute flow fields, electromagnetic fields, temperature fields, chemistry, surface chemistry (i.e. etch surface chemistry or deposition surface chemistry). However, special purpose or custom models developed from first principles to resolve these and other details within the processing system may also be used.

First principles simulation processor 108 is a processing device that applies data input from the data input device 104 to the first principles physical model 108 to execute a first principles simulation. Specifically, the first principles simulation processor 108 may use the data provided by the data input device 104 to set initial conditions and/or boundary conditions for the first principles physical model 106, which is then executed by the simulation module. First principles simulations in the present invention include, but are not limited to, simulations of electromagnetic fields derived from Maxwell's equations, continuum simulations, for example, for mass, momentum, and energy transport derived from continuity, the Navier-Stokes equation and the First Law of Thermodynamics, as well as atomistic simulations derived from the Boltzmann equation, such as for example Monte Carlo simulations of rarefied gases (see Bird, G. A. 1994. *Molecular gas dynamics and the direct simulation of gas flows*, Clarendon Press). First principles simulation processor 108 may be implemented as a processor or workstation physically integrated with the semiconductor processing tool 102, or as a general purpose computer system such as the computer system 1401 of FIG. 14. The output of the first principles simulation processor 108 is a simulation result that is used to facilitate a process performed by the semiconductor processing tool 102. For example, the simulation result may be used to facilitate process development, process control and fault detection as well as to provide virtual sensor outputs that facilitate tool processes, as will be further described below.

As shown in phantom in FIG. 1, the system may also include a tool-level library 108 for storage of simulation results. The library is essentially a compilation of results of past simulations that may be used to provide simulation results in the future. The tool level library 110 may be stored in a separate storage device or in a computer storage device, such as a hard disk, integrated with the first principles simulation processor 106.

It is to be understood that the system in FIG. 1 is for exemplary purposes only, as many variations of the specific hardware and software used to implement the present invention will be readily apparent to one having ordinary skill in the art. For example, the functionality of the first principles physical model 106, first principles simulation processor 108, and tool level library 110 may be combined in a single device. Similarly, the functionality of the data input device 104 may be combined with the functionality of the semiconductor processing tool 102 and/or the first principles simulation processor 108. To implement these variations as well as other variations, a single computer (e.g., the computer system 1401 of FIG. 14) may be programmed to perform the special purpose functions of two or more of the devices shown in FIG. 1. On the other hand, two or more programmed computers may be substituted for one of the devices shown in FIG. 1. Principles and advantages of distributed processing, such as redundancy and replication, may also be implemented as desired to increase the robustness and performance of the system, for example.

Figure 2:
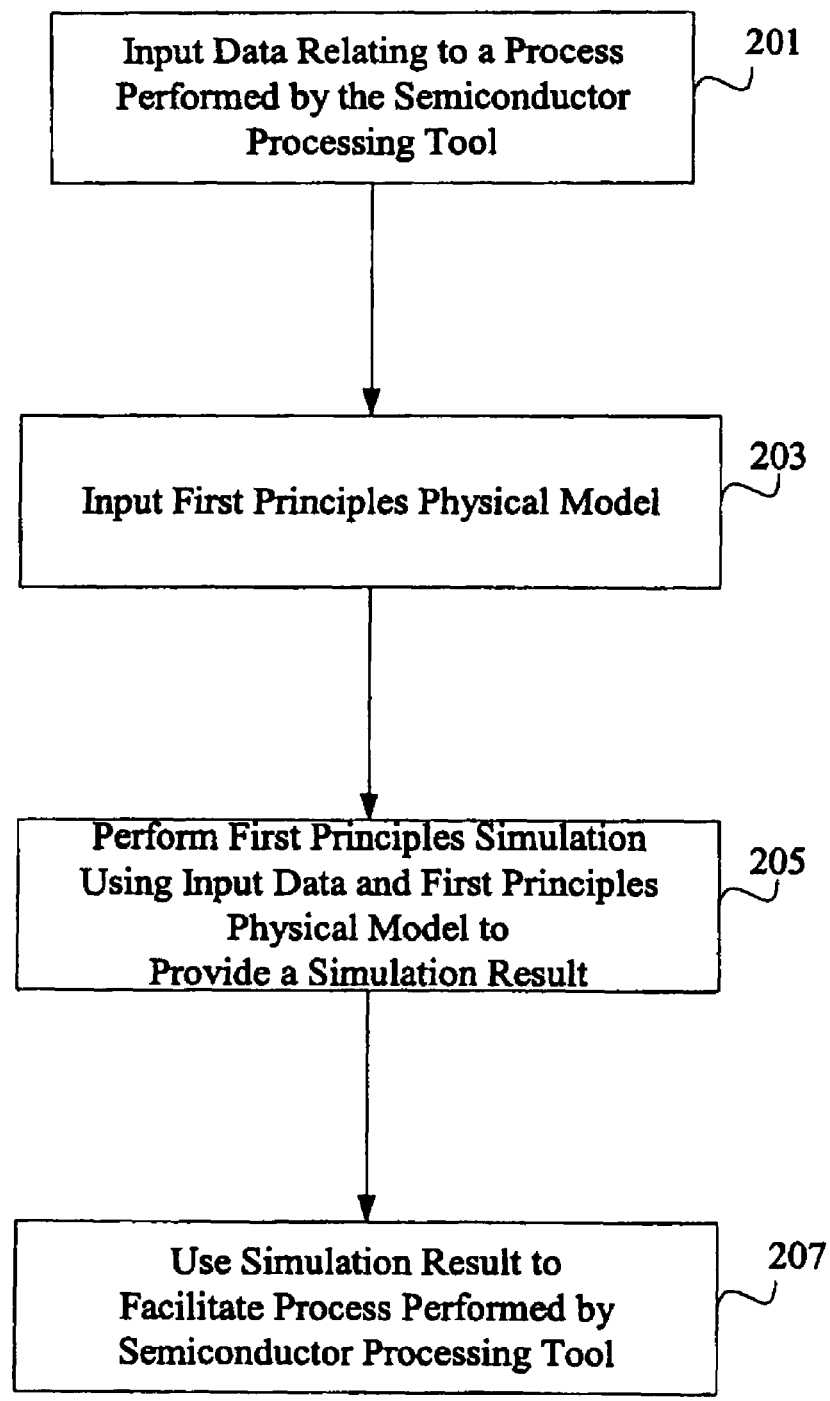
FIG. 2 is a flow chart showing a process for using first principles simulation techniques to facilitate a process performed by a semiconductor processing tool in accordance with an embodiment of the present invention.

FIG. 2 is a flow chart showing a process for using first principles simulation techniques to facilitate a process performed by a semiconductor processing tool in accordance with an embodiment of the present invention. The process shown in FIG. 2 may be run on the first principles simulation processor 104 of FIG. 1, for example. As seen in FIG. 2, the process begins in step 201 with the inputting of data related to a process performed by the semiconductor processing tool 102. As discussed above, the input data may be data relating to physical attributes of the tool/tool environment and/or data relating to a process performed by the tool on a semiconductor wafer or results of such process. As also described above, the input data may be directly input from a physical sensor or metrology tool coupled to the first principles simulation processor 104, or indirectly input from a manual input device or database. Where the data is indirectly input by manual input device or a database, the data may be data that was recorded from a previously run process, such as sensor data from a previously run process. Alternatively the data may be set by the simulation operator as "best known input parameters" for the particular simulations, which may or may not relate to the data collected during a process. The type of input data input by the processing tool generally depends on the desired simulation result.

In addition to inputting the input data, the first principles simulation processor 104 also inputs the first principles physical model 106 as shown by step 203. Step 203 includes inputting the physical attributes of the tool modeled by the model, as well as first principles equations codified in software necessary to perform a first principles simulation of a desired attribute of the process performed by the semiconductor processing tool 102. The first principles physical model 106 may be input to the processor from an external memory or an internal memory device integral to the processor. Moreover, while step 203 is shown in FIG. 2 as following step 201, it is to be understood that the first principles simulation processor 104 may perform these steps simultaneously or in reverse of the order shown in FIG. 2.

In step 205, the first principles simulation processor 108 uses the input data of step 201 and the first principles physical model of step 203 to execute a first principles simulation and provide a simulation result. Step 205 may be performed either concurrently with or not concurrently with the process performed by the semiconductor processing tool. For example, simulations that can be performed at short solution times may be run concurrently with a tool process, and results used to control the process. More computationally intensive simulations may be performed not concurrently with the tool process and the simulation result may be stored in a library for later retrieval. In one embodiment, step 205 includes using the input data of step 201 to set initial and/or boundary conditions for the physical model provided in step 205.

Once the simulation is executed, the simulation result is used to facilitate a process performed by the semiconductor processing tool 102. As used herein, the term "facilitate a process performed by the semiconductor processing tool" includes using the simulation result for example to detect a fault in the process, to control the process, to characterize the process for manufacturing runs, to provide virtual sensor readings relating to the process, or any other use of the simulation result in conjunction with facilitating a process performed by the semiconductor processing tool 102.

Figure 3:
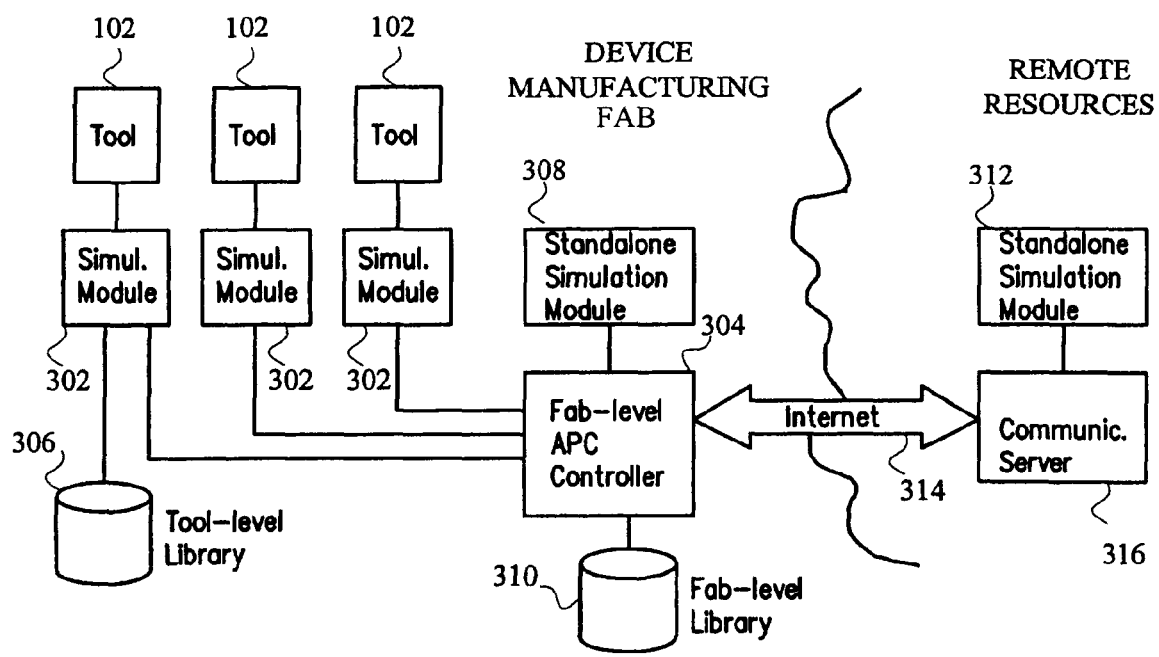
FIG. 3 is a block diagram of a network architecture that may be used to provide first principles simulation techniques to facilitate a process performed by a semiconductor processing tool in accordance with an embodiment of the present invention.

FIG. 3 is a block diagram of a network architecture that may be used to provide first principles simulation techniques to facilitate a process performed by a semiconductor processing tool in accordance with an embodiment of the present invention. As seen in this figure, the network architecture includes a device manufacturing fab connected to remote resources via the Internet 314. The device manufacturing fab includes a plurality of semiconductor processing tools 102 connected to respective simulation modules 302. As described with respect to FIG. 1, each semiconductor processing tool 102 is a tool for performing a process related to manufacturing a semiconductor device such as an integrated circuit. Each simulation module 302 is a computer, workstation, or other processing device capable of executing first principles simulation techniques to facilitate a process performed by a semiconductor processing tool 102. Thus, each simulation module 302 includes the first principles physical model 106 and the first principles simulation processor 108 described with respect to FIG. 1, as well as any other hardware and/or software that may be helpful for executing first principles simulations. Moreover, simulation modules 302 are configured to communicate with the fab-level advanced process control (APC) controller using any known network communication protocol. Each simulation module 302 may be implemented as a general purpose computer such as the computer system 1401 of FIG. 14.

While not shown in FIG. 3, each simulation module 302 is associated with a data input device for inputting data relating to a process performed by a tool 102. In the embodiment of FIG. 3, the simulation modules 302 are directly coupled to a respective tool 102, and therefore, the data input device is implemented as a physical sensor and/or metrology tool physically mounted on a respective tool 102. However, as noted above, the data input device may be implemented as a manual input device used by the simulation module operator, or a database. In addition, each simulation module 302 may be configured to store information in and retrieve information from a tool-level library such as the library 306. As also noted above, the tool level library is essentially a compilation of past simulation results that may be useful for simulations in the future.

In one embodiment of the present invention, each simulation module 302 is connected to main fab-level APC controller 304 via network connections. As seen in FIG. 3, the fab-level APC controller 304 may also be connected to a standalone simulation module 308 and fab-level library 310 as well as the standalone simulation module 312 via Internet 314 and communications server 316.

The standalone simulation modules 308 and 312 are computational resources that may be used to aid the simulation modules 302 in performing computationally intensive first principles simulations as will be further described below. The fab-level library 310 is a database for storing simulation results obtained from any of the simulation modules of the network system. The fab-level APC controller 304 is any suitable workstation, server, or other device for communicating with the simulation modules 302, 308 and 312, and for storing information in and retrieving information from the fab-level library 310. The fab-level APC controller 304 also facilitates processes performed by the tools 102 based on simulation results of the simulation modules 302. For example, the APC controller may be configured to receive a simulation result from a simulation module and use the simulation result to implement a control methodology for process adjustment and/or correction of any of the tools 102. The fab-level APC controller 304 communicates with the simulation modules 302, 308 and 312, and the fab-level library 310 using any suitable protocol and may be implemented using the computer system 1401 of FIG. 14, for example.

The present inventors have discovered that the network configuration of FIG. 3 provides computational and storage resource sharing that allows a broad range of first principles simulation results at reasonable solution speeds, thus providing meaningful on-tool simulation capabilities that can facilitate processes performed by the tool. Specifically, while simple simulations may be executed by a tool's dedicated simulation module, complex simulations requiring greater computational resources may be executed using code parallelization techniques on multiple simulation modules in the network that may be on-tool or standalone. Even on-tool simulation modules in equipment currently under preventive maintenance may be used as a shared computational resource, provided there is power to the simulation module. Similarly, simulation results used for later lookup can be stored in libraries (e.g. storage devices) anywhere in the fab network, and accessed by all tools when lookups of diagnostic or control data are made.

The present inventors have also discovered that the network architecture of FIG. 3 provides the ability to distribute model results done at one processing tool 102 for one condition set, to other similar or identical tools operating later under the same or similar conditions, so redundant simulations are eliminated. Running simulations only for unique processing conditions at on-tool and standalone modules and re-using results from similar tools that have already known simulated solutions allows for rapid development of lookup libraries containing results that can be used for diagnostics and control over a large range of processing conditions. Further, the reuse of the known solutions as initial conditions for first principles simulation reduces the computational requirements and facilitates the production of simulated solutions in a time frame consistent with on-line control. Similarly, the network architecture of FIG. 3 also provides the ability to propagate changes and refinements made to physical models and model input parameters from one simulation module to others in the network. For example, if during process runs and parallel executions of a model it is determined that some input parameters need to be changed, then these changes can be propagated to all other simulation modules and tools via the network.

The network architecture of FIG. 3 also permits an optional connection to remote computational resources including simulation modules that can assist in executing simulation tasks and communicating the results back to the device maker fab. Connection to remote resources can be made by way of a secure connection, such as a Virtual Private Network. Such secure connections may also be established to third-parties that provide computational resources to support first-principles simulation on processing tools. Similarly the remote communications server can act as a "clearinghouse" for most up-to-date software, models, input parameters, and simulation results, which multiple customers can use, thereby further increasing the speed at which accurate results libraries are created. These updated models can be uploaded from a customer site to the remote resources, analyzed, and if it is determined that the refinement applies to most customers, the refinement is made available via the communications server and Internet connection to other customers.

Thus, the present inventors have discovered meaningful on-tool simulation capabilities that can facilitate processes performed by the tool without the need for expensive computers dedicated to the tool. Based on this discovery, the present inventors further developed novel on-tool simulation systems for providing virtual sensor readings, providing characterization data for use in developing processes performed by the tool, and for providing process fault detection and process control capabilities. These uses of the inventive on-tool simulation to facilitate a process performed by the semiconductor processing tool may be implemented on a single tool and simulation module, or on an interconnected network of computational and storage resources such as that described in FIG. 3.

Specifically, on-tool simulation results may be used to augment measured data sets from physical sensors. One of the shortcomings of current-generation semiconductor processing tools is the relatively small number of sensors being used to characterize the currently running process, particularly on production tools. Installing more sensors on a tool becomes a very expensive proposition if the number of required sensors is large, and in many cases, there is no space left on the tool for modification and installation of additional sensors. Yet, even in production tools, there are situations in which "measurements" are needed in locations where sensors cannot be installed. The on-tool first principles simulation capability of the present invention provides the required "measurements" without any additional hardware, provided robust models exist to predict the measurements using other actual measurements as initial and/or boundary conditions. In this document, the term "virtual sensor" is used to refer to a "sensor" in which the measurements are actually provided by predictions from an on-tool simulation.

Figure 4:
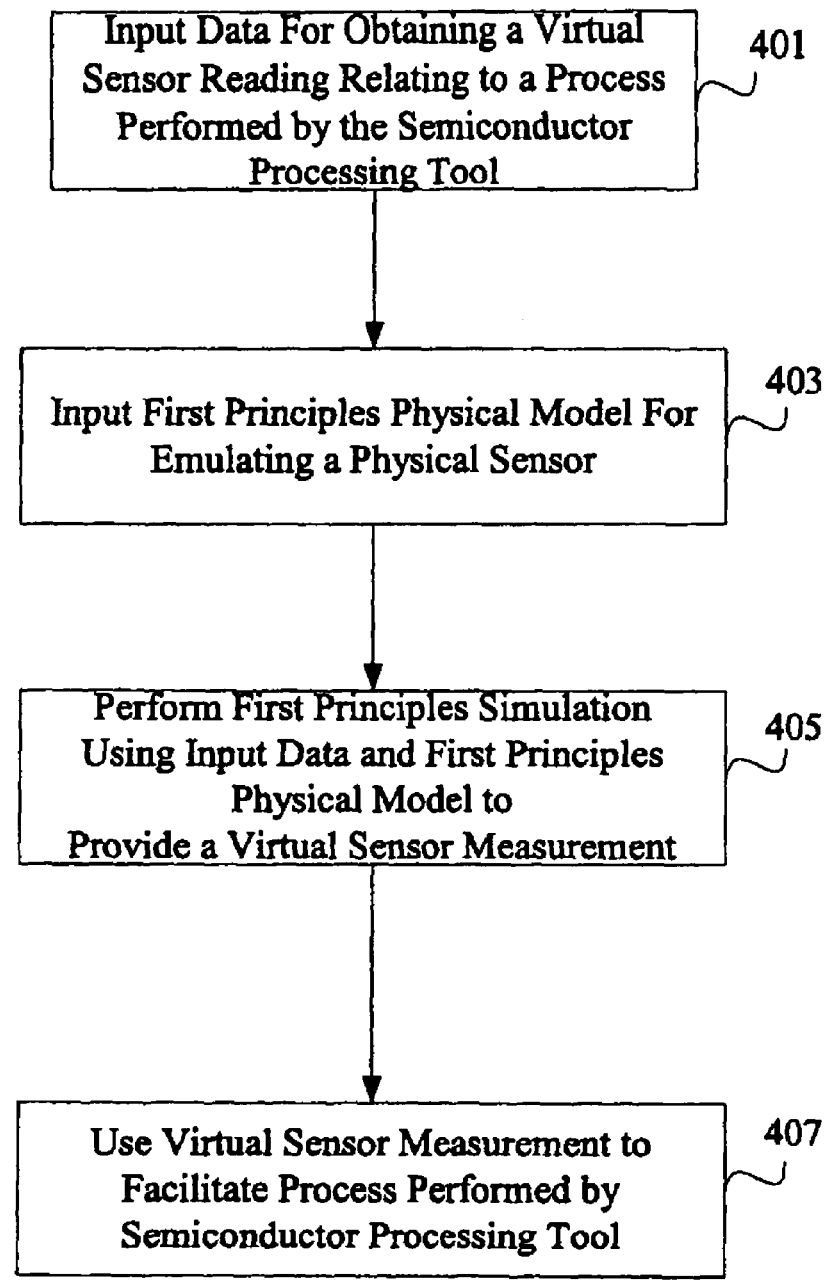
FIG. 4 is a block diagram of a system for using first principles simulation techniques to provide virtual sensor measurements on a semiconductor processing tool in accordance with an embodiment of the present invention.

FIG. 4 is a flow chart showing a process for using first principles simulation techniques to provide virtual sensor readings that may facilitate a process performed by a semiconductor processing tool in accordance with an embodiment of the present invention. The process shown in FIG. 4 may be run on the first principles simulation processor 108 of FIG. 1, for example, or using the network architecture of FIG. 3. As seen in FIG. 4, the process begins in step 401 with inputting data for obtaining a virtual sensor reading relating to a process performed by the semiconductor processing tool 102. The data input in step 401 may be any of the data types described with respect to step 201 of FIG. 2, as long as the input data enables a first principles simulation to provide a virtual sensor simulation result. Thus, the input data may be data related to physical attributes of the tool/tool environment, a process performed by the tool on a semiconductor wafer, or the results of such process. Moreover, the input data of step 401 may be directly input from a physical sensor or metrology tool coupled to the first principles simulation processor 108, or indirectly input from a manual input device or database.

In one example of using metrology data as input data for obtaining a virtual sensor reading, metrology data pertaining to an etch mask pattern and underlying film thickness can serve as input to a first principles etch process model, and subsequently performed etch process. Prior to performing the etch process, measurements of the mask pattern including pattern critical dimension(s) and mask film thickness at one or more locations (e.g., center and edge) on a given substrate for a given substrate lot can be provided as input to the etch process model. Moreover, measurements of the underlying film thickness (i.e., film thickness of the film to be etched) can also serve as input to the etch process model. Following execution of the first principles etch process model for a specified process recipe, and the above identified metrology input data, the time for completing the etch process at, for example, the center and edge can be calculated as output, and this output can be utilized to determine an over-etch period and any process adjustment necessary to preserve, for example, feature critical dimensions center-to-edge. Thereafter, these results can be utilized to adjust the process recipe for the current or upcoming substrate lot.

Where the data is indirectly input by manual input device or a database, the data may be data that was recorded from a previously run process, such as sensor data from a previously run process. Alternatively the data may be set by the simulation operator as "best known input parameters" for the particular simulations, which may or may not relate to the data collected during a process. The type of input data input by the processing tool generally depends on the desired virtual sensor measurements to be obtained.

In addition to inputting the input data, the first principles simulation processor 108 also inputs the first principles physical model for emulating a physical sensor as shown by step 403. Step 403 includes inputting the physical attributes of the tool modeled by the model, as well as the first principles fundamental equations necessary to perform a first principles simulation to obtain a virtual sensor reading that can substitute for a physical sensor reading relating to the process performed by the semiconductor processing tool 102. The first principles physical model of step 403 may be input to the processor from an external memory or an internal memory device integral to the processor. Moreover, while step 403 is shown in FIG. 4 as following step 401, it is to be understood that the first principles simulation processor 104 may perform these steps simultaneously or in reverse of the order shown in FIG. 4.

In step 405, a first principles simulation processor, such as the processor 108 of FIG. 1, uses the input data of step 401 and the first principles physical model of step 403 to execute a first principles simulation and provide a virtual sensor measurement. Step 405 may be performed either at a different time, or concurrently with the process performed by the semiconductor processing tool. Simulations run not concurrently with the wafer process may use initial and boundary conditions stored from previous process runs with the same or similar process conditions. As noted with respect to FIG. 2 above, this is suitable in cases when the simulation runs slower than the wafer process; time may be used between wafer cassettes and even during tool shutdowns for preventive maintenance, for example, to have the simulation module solve for required measurements. These "measurements" can later be displayed during the wafer process as if they were solved for concurrently with the wafer process, and if the process is executed under the same process conditions as the simulation was run.

Where the first principles simulation is run concurrently with the process performed by the semiconductor tool, the data input in step 401 may be data from physical sensors mounted on the semiconductor processing tool to sense a predetermined parameter during the process run by the tool. In this embodiment, steady-state simulations are repeatedly run concurrently with the process by using the physical sensor measurements to repeatedly update boundary conditions of the first principles simulation model. The virtual measurement data generated is useful for monitoring by tool operators, and in no way differs from measurements made by physical sensors. However, the simulation is preferably capable of running fast so virtual measurements can be updated at a reasonable rate (e.g. "sampling rate"). The first principles simulation may also be run concurrently without the use of physical sensor input data. In this embodiment, initial and boundary conditions for the simulation are set based on the initial setting of the tool prior to a tool process and the readings of physical sensors prior to the run; a full time-dependent simulation is then run during, but independent of, the tool process. The obtained virtual measurements can be displayed to and analyzed by the operator like any other actually measured tool parameter. If the simulation runs faster than the wafer process, then simulation results are known ahead of the corresponding actual measurements made during the wafer process. Knowing the measurements ahead of time allows the implementation of various feed-forward control functions based on these measurements as will be further described below.

In yet another embodiment of the process of FIG. 4, the first principles simulation may be performed in a self correcting mode by comparing virtual sensor measurements to corresponding physical sensor measurements. For example, during the first run with a certain process recipe/tool condition, the tool operator would use the "then best-known input parameters" for the model. During and after each simulation run, the simulation module(s) can compare the predicted "measurements" to the actual measurements, at locations where actual measurements from physical sensors, are made. If a significant difference is detected, optimization and statistical methods may be used to alter the input data and/or the first principles physical model itself, until better agreement of predicted and actual measured data is achieved. Depending on the situation, these additional refinement simulation runs may be made concurrent with the next wafer/wafer cassettes, or when the tool is off-line. Once refined input parameters are known, they can be stored in a library for later use, eliminating the need for subsequent input parameter and model refinements for the same process condition. Furthermore, refinements of the model and input data can be distributed via the network setup of FIG. 3 to other tools, eliminating the need for self-correcting runs in those other tools.

Once the simulation is executed to provide a virtual sensor measurement, the virtual sensor measurement is used to facilitate a process performed by the semiconductor processing tool 102. For example, the virtual sensor measurements may be used as inputs to the tool control system for various purposes, such as comparison to actual sensor measurements, in-process recipe changes, fault detection and operator warnings, generation of databases of process conditions, refinement of models and input data, etc. These are typical actions performed by a tool control system based on measurements made by physical sensors. Use of virtual sensor measurement may be used to characterize or control a process as will be described below. Moreover, the virtual sensor measurements may be stored in libraries on computer storage media for later use, eliminating the need to repeat simulation runs with the same input conditions, unless there has been a change in the model or input conditions (e.g. during refinement, for example).

In addition to providing virtual sensor readings, the on-tool first principles simulation capability of the present invention facilitates semiconductor process development. More specifically, characterization of a process on a tool by use of the current design-of-experiments process development approach requires a different process run for each variation of the operating parameters, which results in time consuming and expensive characterization processes. The on-tool first principles simulation capabilities of the present invention allow parameter variations and what-if analysis on the tool itself, and without actual process runs including variations of those process variables that are well-modeled by the first-principles simulation. This allows a large reduction of the number of experiments needed to characterize a process on a tool.

Figure 5:
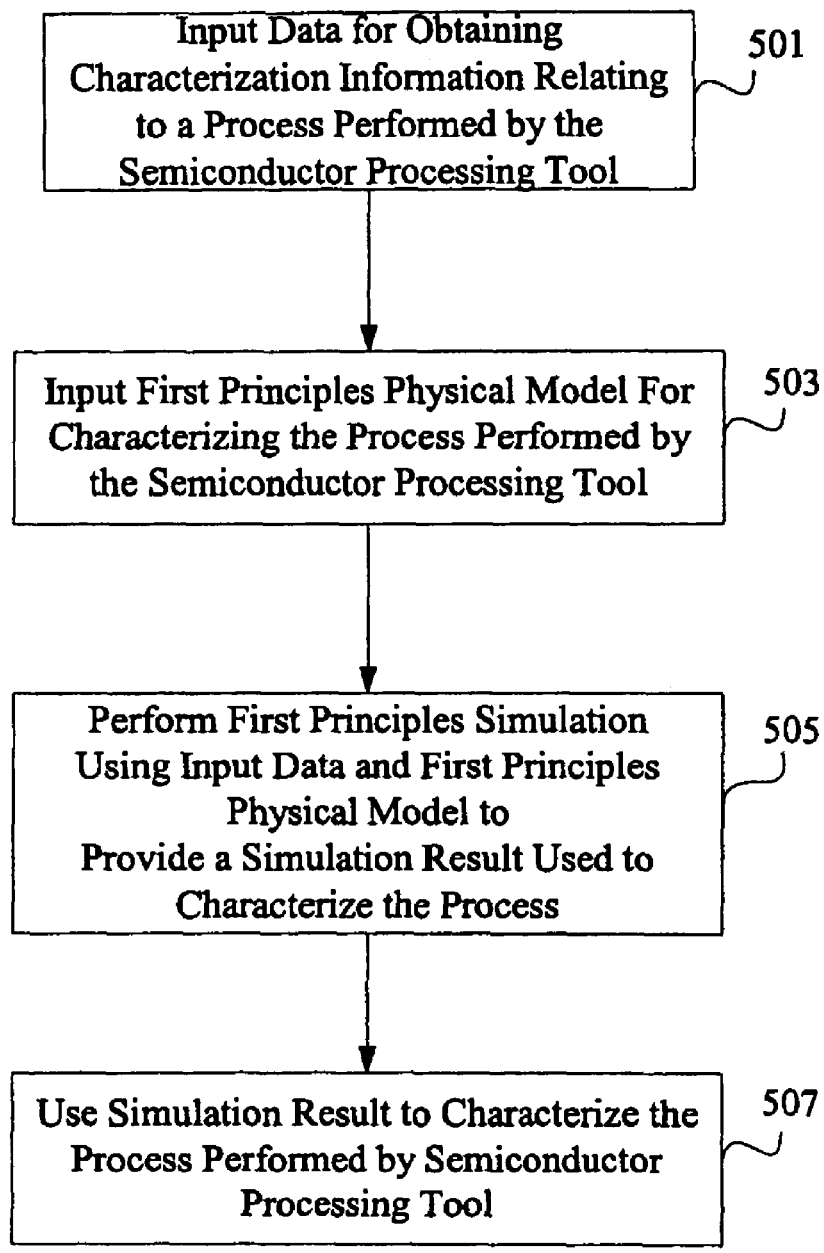
FIG. 5 is a block diagram of a system for using first principles simulation techniques to characterize a process on a semiconductor processing tool in accordance with an embodiment of the present invention.

FIG. 5 is a flow chart showing a process for using first principles simulation techniques to characterize a process performed by a semiconductor processing tool in accordance with an embodiment of the present invention. The process shown in FIG. 5 may be run on the first principles simulation processor 108 of FIG. 1, for example, or using the architecture of FIG. 3. As seen in FIG. 5, the process begins in step 501 with inputting data for obtaining characterization information relating to a process performed by the semiconductor processing tool 102. The data input in step 501 may be any of the data types described with respect to step 201 of FIG. 2, as long as the input data enables a first principles simulation to provide simulation results used to characterize a process performed by the semiconductor processing tool. Thus, the input data may be data related to physical attributes of the tool/tool environment, a process performed by the tool on a semiconductor wafer, or the results of such process. Moreover, the input data of step 501 may be directly input from a physical sensor or metrology tool coupled to the first principles simulation processor 104, or indirectly input from a manual input device or database. The data may also be input from a simulation module providing virtual sensor readings as described with respect to FIG. 4. Where the data is indirectly input by manual input device or a database, the data may be data that was recorded from a previously run process, such as sensor data from a previously run process. Alternatively the data may be set by the simulation operator as "best known input parameters" for the particular simulations, which may or may not relate to the data collected during a process. The type of input data input by the processing tool generally depends on the desired characterization data to be obtained.

In addition to inputting the input data, the first principles simulation processor 108 also inputs the first principles physical model for characterizing the process as shown by step 503. Step 503 includes inputting the physical attributes of the tool modeled by the model, as well as the first principles fundamental equations typically codified in software necessary to perform a first principles simulation to obtain characterization data for the process performed by the semiconductor processing tool 102. The first principles physical model of step 503 may be input to the processor from an external memory or an internal memory device integral to the processor. Moreover, while step 503 is shown in FIG. 5 as following step 501, it is to be understood that the first principles simulation processor 108 may perform these steps simultaneously or in reverse of the order shown in FIG. 5.

In step 505, a first principles simulation processor, such as the processor 108 of FIG. 1, uses the input data of step 501 and the first principles physical model of step 503 to execute a first principles simulation and provide a simulation result used to characterize the process. Step 505 may be performed either at a different time, or concurrently with the process performed by the semiconductor processing tool. Simulations run not concurrently with the tool process may use initial and boundary conditions stored from previous process runs with the same or similar process conditions. As noted with respect to FIG. 2 above, this is suitable in cases when the simulation runs slower than the wafer process, and time may be used between wafer cassettes and even during tool shutdowns for preventive maintenance, for example, to have the simulation module solve for required simulation results.

Where the first principles simulation is run concurrently with the process performed by the semiconductor tool, the first principles simulation may provide characterization data of a same or different parameter tested by an experimental process performed by the simulation. For example, the first principles simulation may be performed to provide variations of a parameter being tested by a design of experiments process performed by the semiconductor processing tool. Alternatively, the first principles simulation may provide characterization data for a parameter different than a parameter tested in an experiment performed on the semiconductor processing tool.

Once the simulation is executed in step 505, the simulation result is used as part of a data set to characterize the process performed by the semiconductor processing tool as shown in step 507. As noted above, this use of simulation results as characterization data can significantly reduce or eliminate the need for time consuming and expensive experiments required of the design of experiments approach to characterizing a process. The characterization data set may be stored in a library for use in a later process performed by the tool.

The on-tool first principles simulation capability of the present invention may also be used to provide fault detection and process control. Existing methods for fault detection and process control of a process performed by the semiconductor processing tool are mostly statistical in nature. These methods require experimental design methodology that involves the burden of performing multiple process runs while varying all of the operating parameters of the tool. The results of these process runs are recorded in a database that is used for look-up, interpolation, extrapolation, sensitivity analysis, etc. in order to sense or control a process of the semiconductor processing tool.

However, for these statistical methods to be able to reliably sense and control the tool under widely varying operating conditions, the database must be broad-enough to cover all operating conditions, which makes the database a burden to produce. The on-tool first principles simulation capability of the present invention does not require the creation of any such database because tool response to process conditions is predicted from physical first principles directly and accurately, given accurate working models and accurate input data. However, statistical methods can still be used to refine working models and input data as more run-time information under different operating conditions becomes available, but having such information is not required by the present invention for process sensing and control capability. Indeed, the process model can provide a basis upon which the process can be empirically controlled by using the process model to extend those known empirical solutions to "solutions" where empirical results have not been physically made. Hence, the present invention in one embodiment empirically characterizes the process tool by supplementing the known (i.e. physically observed) solutions with first principle simulation module solutions, the simulation module solutions being consistent with the known solutions. Eventually, as better statistics develop, the simulation module solutions can be superseded by the database of empirical solutions.

In one embodiment of the present invention, the on-tool first principles simulation does not require the creation or access to a database because tool response to process conditions is predicted directly from first principles. Statistical methods may still be used to refine working models and the input data, as more run time information under different operating conditions becomes available, but having such information is not required in this embodiment for process sensing and control and fault detection.

Figure 6:
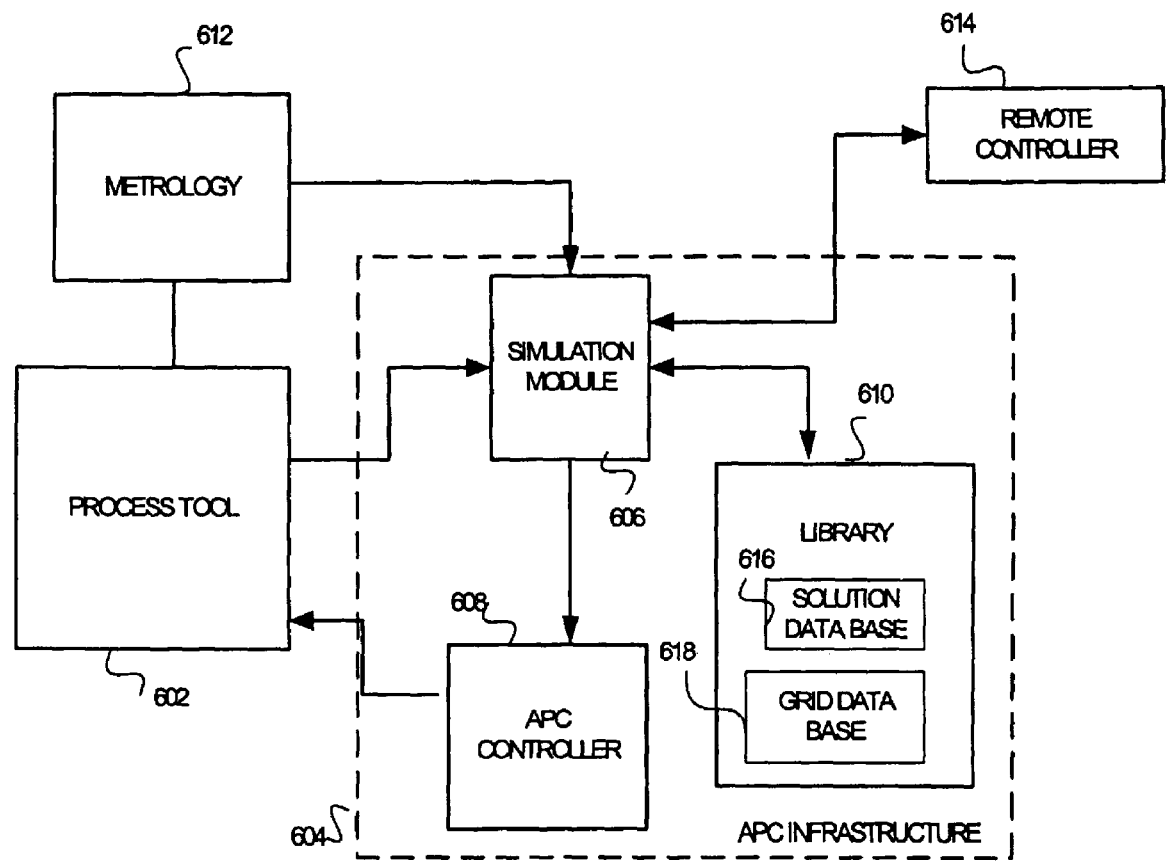
FIG. 6 is a block diagram of a system for using first principles simulation techniques to control a process performed by a semiconductor processing tool in accordance with an embodiment of the present invention.

FIG. 6 is a block diagram of a system for using first principles simulation techniques to control a process performed by a semiconductor processing tool in accordance with an embodiment of the present invention. As seen in this figure, the system includes a process tool 602 coupled to an advanced process control (APC) infrastructure 604, which includes a simulation module 606, an APC controller 608, and a library 610. Also coupled to the APC infrastructure 604 is a metrology tool 612 and remote controller 614. As seen in FIG. 6, the library 610 may include a solution database 616 and a grid database 618.

The process tool 602 may be implemented as the semiconductor processing tool 102 described with respect to FIG. 1. Thus, the process tool 602 may be a material processing system, etch system, photoresist spin coating system, lithography system, dielectric coating system, deposition system, rapid thermal processing (RTP) system for thermal annealing, and/or batch diffusion furnace or other suitable semiconductor manufacturing processing system, for example. As seen in FIG. 6, the process tool 602 provides tool data to the simulation module 606 and receives control data from the APC controller 608 as will be further described below. The process tool 602 is also coupled to metrology tool 612, which provides process results information to the simulation module 606.

The simulation module 606 is a computer, workstation, or other processing device capable of executing first principles simulation techniques to control a process performed by the tool 602, and therefore may be implemented as the simulation module 302 described with respect to FIG. 3. Thus, the simulation module 602 includes the first principles physical model 106 and the first principles simulation processor 108 described with respect to FIG. 1, as well as any other hardware and/or software that may be helpful for executing first principles simulations to control a process. In the embodiment of FIG. 6, the simulation module 606 is configured to receive tool data from one or more diagnostics on the tool 602 for processing and subsequent use during simulation model execution. The tool data may include the aforementioned fluid mechanic data, electrical data, chemical data, thermal, and mechanical data, or any of input data described with respect to FIGS. 1 and 2 above. In the embodiment of FIG. 6, the tool data can be utilized to determine boundary conditions and initial conditions for a model to be executed on the simulation module 606. The model can, for example, include the aforementioned ANSYS, FLUENT, or CFD-ACE+ codes, to compute flow fields, electromagnetic fields, temperature fields, chemistry, surface chemistry (i.e. etch surface chemistry or deposition surface chemistry), etc. The models developed from first principles can resolve details within the processing system in order to provide an input for process control of the tool.

The APC controller 608 is coupled to the simulation module 606 in order to receive a simulation result from the simulation module 606 and to utilize the simulation result to implement a control methodology for process adjustment/ correction of a process performed on the tool 602. For example, an adjustment can be made to correct process non-uniformities. In one embodiment of the present invention, one or more perturbation solutions are executed on the simulation module 606, centered on a process solution for a process currently run on the process tool 602. The perturbation solutions can then be utilized with, for instance, a nonlinear optimization scheme such as the method of steepest descent (Numerical Methods, Dahlquist & Bjorck, Prentice-Hall, Inc., Englewood Cliffs, N.J., 1974, p. 441; Numerical Recipes, Press et al., Cambridge University Press, Cambridge, 1989, pp. 289-306) to determine a direction within an n-dimensional space for applying the correction. The correction can then be implemented on the process tool 602 by the APC controller 608. For example, at least one of tool data (i.e. physical sensor data), or results from a current execution of the simulation can indicate that the processing system exhibits a non-uniform static pressure field overlying the substrate given the current initial/boundary conditions. The non-uniformity can, in turn, contribute to an observed non-uniformity of a metric used to quantify the performance of the substrate process, measured by the metrology tool, on the substrate, i.e. a critical dimension, feature depth, film thickness, etc. By perturbing the input parameters to the current execution of the simulation, a set of perturbation solutions can be obtained in order to determine the best "route" to take in order to remove, or reduce, the static pressure non-uniformity. For example, the input parameters for the process can include a pressure, a power (delivered to an electrode for generating plasma), a gas flow rate, etc. While perturbing one input parameter at a time and holding all other input parameters constant, a sensitivity matrix can be formed that may be employed with the above identified optimization scheme to derive a correction suitable for correcting the process non-uniformity.

In another embodiment of the present invention, the simulation results are utilized in conjunction with a principal components analysis (PCA) model formulated as described in pending U.S. Patent Application Ser. No. 60/343,174, entitled "Method of detecting, identifying, and correcting process performance," the contents of which are incorporated herein by reference. Therein, a relationship can be determined between a simulated signature (i.e. spatial components of the simulation model results) and a set of at least one controllable process parameter using multivariate analysis (i.e. PCA). This relationship can be utilized to improve the data profile corresponding to a process performance parameter (i.e., a model result). The principle components analysis determines a relationship between spatial components of a result (or predicted output) of a simulation of the semiconductor processing tool and a set of at least one control variable (or input parameter). The determined relationship is utilized to determine a correction to the at least one control variable (or input parameter) in order to cause a minimization of the magnitude of the spatial components in order to improve (or decrease) the non-uniformity of the simulated result (or measured result if available).

As noted above, the library 610 coupled to the simulation module 606 in FIG. 6 is configured to include a solution database 616 and a grid database 618. The solution database 616 can include a coarse n-dimensional database of solutions, whereby the order n of the n-dimensional space is governed by the number of independent parameters for the given solution algorithm. When the simulation module 606 retrieves the tool data for a given process run, the library 610 can be searched based upon model input to determine the closest fitting solution. This solution can be used according to the present invention as an initial condition for subsequent first principles simulation, thereby reducing the number of iterations required to be performed by the simulation module to provide a simulation result. With each model execution, the new solution can be added to the solution database 616. Additionally, the grid database 618 can include one or more grid sets, whereby each grid set addresses a given process tool or process tool geometry. Each grid set can include one or more grids with different grid resolutions, ranging from coarse to fine. The selection of grids can be utilized to reduce solution time by performing multi-grid solution techniques (i.e. solve for a simulation result on coarse grid, followed by solution on finer grid, finest grid, etc.).

The metrology tool 612 may be configured to measure process performance parameters such as: etch rate, deposition rate, etch selectivity (ratio of the rate at which a first material is etched to the rate at which a second material is etched), an etch critical dimension (e.g. length or width of feature), an etch feature anisotropy (e.g. etch feature sidewall profile), a film property (e.g. film stress, porosity, etc.), a mask (e.g. photoresist) film thickness, a mask (e.g. photoresist) pattern critical dimension, or any other parameter of a process performed by the semiconductor processing tool. The remote controller 612 exchanges information with the simulation module 606 including model solver parameters (i.e. solver parameter updates), solution status, model solutions, and solution convergence history.

Figure 7:
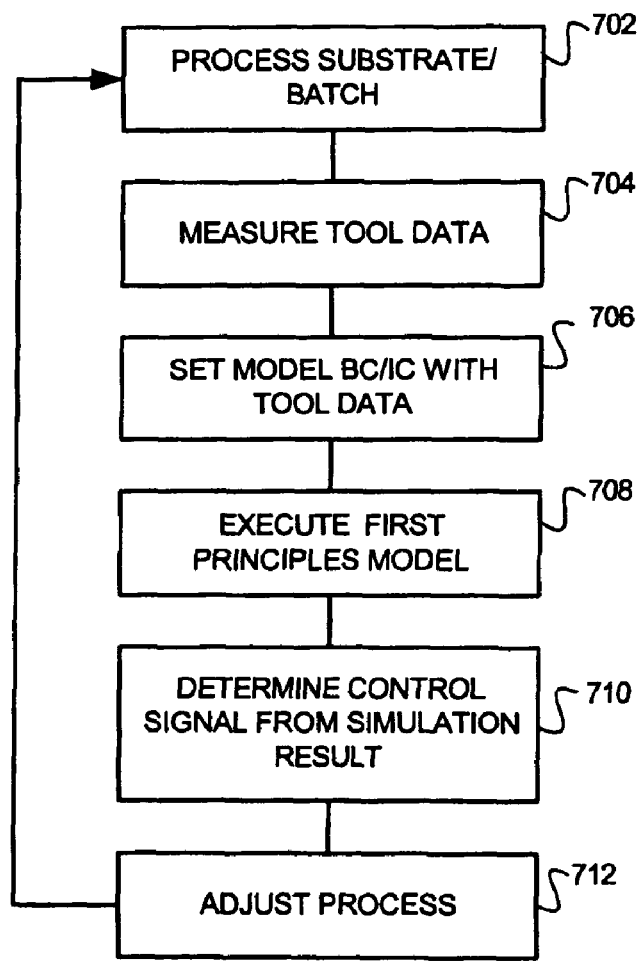
FIG. 7 is a flow chart showing a process for using first principles simulation techniques to control a process performed by a semiconductor processing tool in accordance with an embodiment of the present invention.

FIG. 7 is a flow chart showing a process for using first principles simulation techniques to control a process performed by a semiconductor processing tool in accordance with an embodiment of the present invention. The flow chart is presented beginning with step 702 for processing a substrate or batch of substrates within a process tool, such as the process tool 602. At step 704, tool data is measured and provided as input to a simulation module such as simulation module 606. Boundary conditions and initial conditions are then imposed on the first principles physical model of the simulation module to set-up the model as shown in step 706. At step 708, the first principles physical model is executed to provide first principles simulation results that are output to a controller such as the APC controller 608 of FIG. 6. The controller then determines a control signal from the simulation result as shown in step 710. At any time, for example, from run-to-run or batch-to-batch, the operator has the opportunity to select the control algorithm to be employed within the APC controller 608. For example, the APC controller can utilize either the process model perturbation results, or the PCA model results. In either run-to-run or batch-to-batch, the process can be adjusted/corrected by the controller using simulation results as depicted in step 712.

Figure 8:
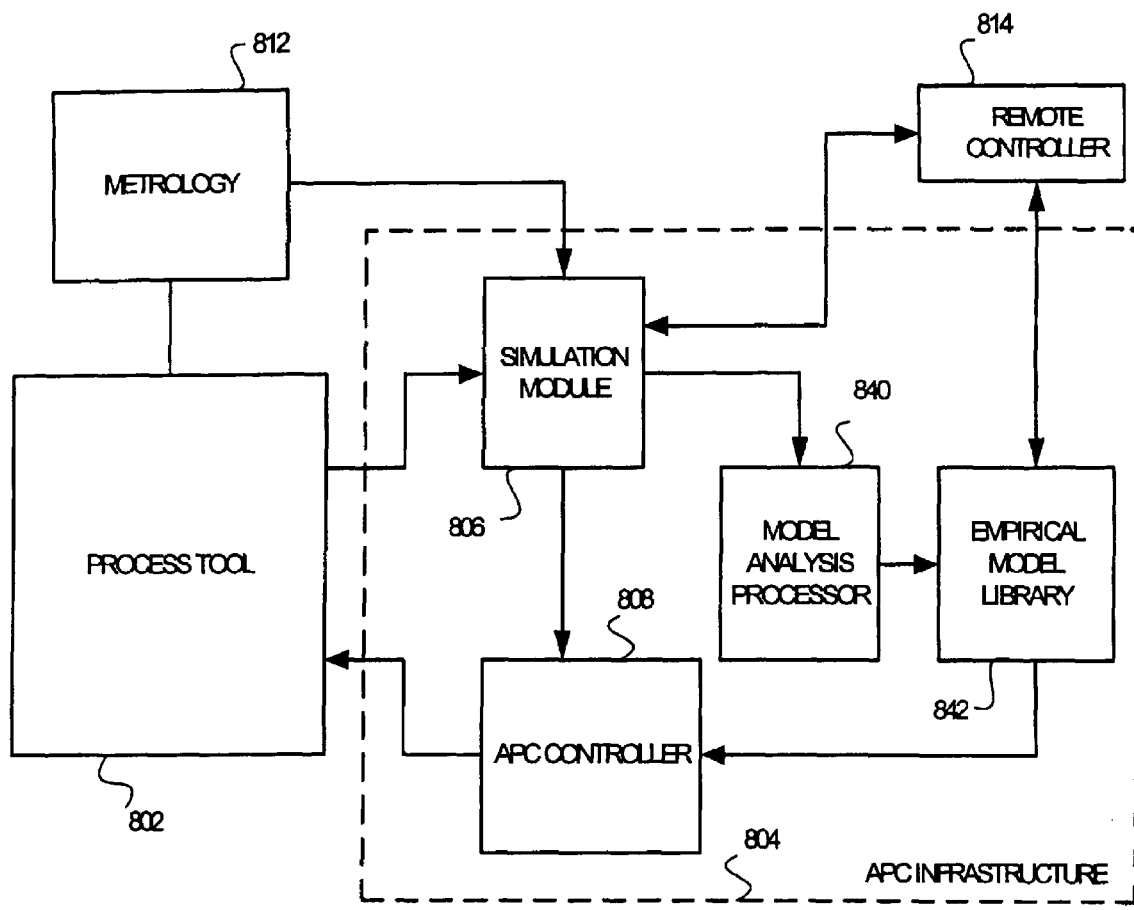
FIG. 8 is a block diagram of a system for using first principles simulation techniques and an empirical model to control a process performed by a semiconductor processing tool in accordance with an embodiment of the present invention.

In another embodiment of the present invention, an empirical model may be used in conjunction with the first principles simulation to provide control of a process performed by the process tool. FIG. 8 is a block diagram of a system for using first principles simulation techniques and an empirical model to control a process performed by a semiconductor processing tool in accordance with an embodiment of the present invention. As seen in this figure, the system includes a process tool 802 coupled to an advanced process control (APC) infrastructure 804, which includes a simulation module 806 and an APC controller 808. Also coupled to the APC infrastructure 804 is a metrology tool 812 and remote controller 814. These items are similar to those corresponding items discussed with respect to FIG. 6, except the items of FIG. 8 are further configured to function in consideration of an empirical model. Thus, these similar items are not described with respect to FIG. 8.

As seen in FIG. 8, the system includes a model analysis processor 840, which is coupled to the simulation module 806 and configured to receive a simulation result from the module 806. In the embodiment of FIG. 8, model analysis includes the construction of an empirical model from non-dimensionalization of the simulation results. As simulation results are received on a run-to-run or batch-to-batch basis, an empirical model is constructed and stored in the empirical model library 842. For example, the process tool 802 undergoes a history of process cycles ranging from process development through yield ramp to volume production. During these process cycles, a process chamber of the tool evolves from a "clean" chamber through chamber qualification and seasoning, to an "aged" chamber preceding chamber cleaning and maintenance. After several maintenance cycles, an empirical model can evolve to include a statistically sufficient sample of the parameter space corresponding to the specific process tool and process associated therewith. In other words, through cleaning cycles, process cycles, and maintenance cycles, the tool 802 (with the aid of the simulation module) inherently determines the bounds of the parameter space. Ultimately, the evolved empirical model stored in library 842 can supersede the generally more intensive process model based on first principles simulation, and can provide input to the APC controller for process adjustment/correction.

As seen in FIG. 8, the remote controller 814 can be coupled to the empirical model library 842 in order to monitor the evolution of the empirical model, and to enact decisions for overriding the simulation module controller input and opting for an empirical model controller input. Also, metrology tool 814 can be coupled to the empirical model database (connection not shown) in order to, similarly, provide input to the empirical model database for calibration.

Figure 9:
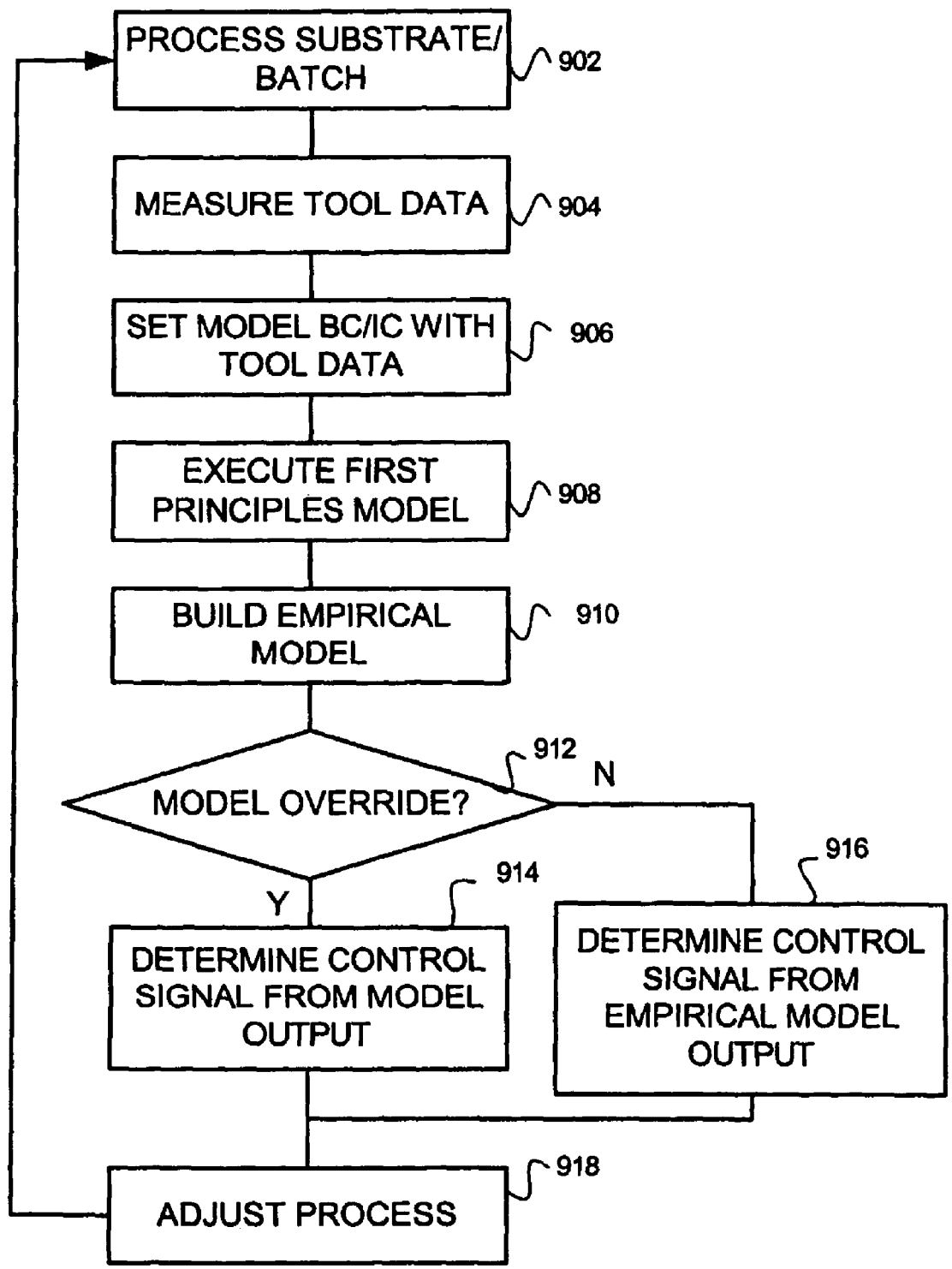
FIG. 9 is a flow chart showing a process for using first principles simulation techniques and an empirical model to control a process performed by a semiconductor processing tool in accordance with an embodiment of the present invention.

FIG. 9 is a flow chart showing a process for using first principles simulation techniques and an empirical model to control a process performed by a semiconductor processing tool in accordance with an embodiment of the present invention. The flow chart is presented beginning with step 902 for processing a substrate or batch of substrates within a process tool, such as the process tool 802. At step 904, tool data is measured and provided as input to a simulation module such as simulation module 806. Boundary conditions and initial conditions are then imposed on the first principles physical model of the simulation module to set-up the model as shown in step 906. At step 908, the first principles physical model is executed to perform first principles simulation results that are output for analysis and construction of an empirical model, as depicted in step 910.

At any time, for example from run-to-run or from batch-to-batch, the operator has the opportunity to select process control based on the first principles simulation or the empirical model. At some point in the building of the empirical model, the operator may select to override the first principles simulation altogether in favor of the empirical model which at that point can use a library of data and interpolation/extrapolation schemes to rapidly extract controller input for a given set of tool data. Thus, decision block 912 determines whether the first principles simulation or the empirical model is used to control the process. Where no override is determined in step 912, the process continues at step 914 with the APC controller determining a control signal from the simulation result. Where model override is selected, the APC controller determines a control signal from the empirical model as shown in step 916. In another embodiment, a combination of first principles simulation results and empirical modeling can be used by the APC controller to control the process. As shown by step 918, the process can be adjusted/corrected by the controller using either the model output shown in step 914 or the empirical model output shown in step 916. Thus, the process of FIG. 9 shows a method of in-situ construction of an empirical model, and, once statistically significant, the empirical model can override the computationally intensive simulation process model. During process control, a filter, such as an exponentially weighted moving average (EWMA) filter, can be employed in order to impart only a fraction of the requested correction. For example, the application of the filter can take the form $X_{new}=(1-\lambda)X_{old}+\lambda(X_{predicted}-X_{old})$, wherein $X_{new}$ is the new value for the given input parameter (control variable), $X_{old}$ is the old (or previously used) value for the given input parameter, $X_{predicted}$ is the predicted value for the input parameter based upon one of the above described techniques, and $\lambda$ is the filter coefficient ranging from 0 to 1.

Figure 10:
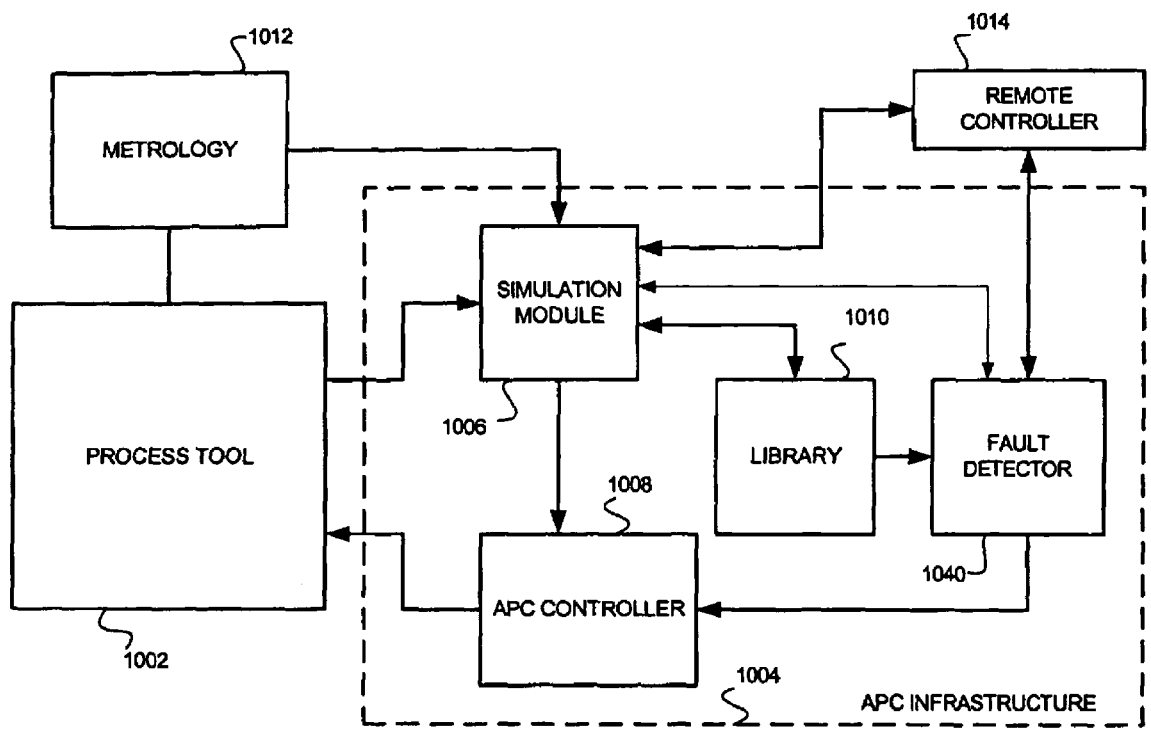
FIG. 10 is a block diagram of a system for using first principles simulation techniques and a fault detector to control a process performed by a semiconductor processing tool in accordance with an embodiment of the present invention.

In yet another embodiment of the present invention, a fault detector/classifier may be used in conjunction with the first principles simulation to provide control of a process performed by the process tool. FIG. 10 is a block diagram of a system for using first principles simulation techniques and a fault detector to control a process performed by a semiconductor processing tool in accordance with an embodiment of the present invention. As seen in this figure, the system includes a process tool 1002 coupled to an advanced process control (APC) infrastructure 1004, which includes a simulation module 1006 and an APC controller 1008 and library 1010. While not shown in FIG. 10, the library 1010 includes a solutions database and a grid database. Also coupled to the APC infrastructure 1004 is a metrology tool 1012 and remote controller 1014. These items are similar to those corresponding items discussed with respect to FIG. 6, except the items of FIG. 10 are further configured to function in consideration of fault detection. Thus, these similar items are not described with respect to FIG. 10.

As seen in FIG. 10, the system includes a fault detector 1040 coupled to the simulation module 1006, and configured to receive a simulation result from the module 1006. For example, the output of the simulation module 1006 can include a profile of data. The profile of data can then serve as input to multivariate analysis such as partial least squares (PLS) performed in the fault detection device 1040. In the PLS analysis, a set of loading (or correlation) coefficients can be defined which relate tool perturbation data ($\overline{X}$) to process performance data ($\overline{Y}$) describing a difference between simulated results Ysim and actual results Yreal.

For example, using PLS, observation sets of tool perturbation data are received by the fault detector 1040 from the simulation module. Either the tool perturbation data is determined in-situ, centered on the current model solution, or determined a priori within the n-dimensional solution space using the process model. The order (n) of the n-dimensional parameter space pertains to the number of independent parameters in the solution space (i.e. pressures, mass flow rates, temperatures, etc.; see below).

For a given perturbation set, the respective perturbation derivatives (i.e. $\partial Y/\partial v1$, $\partial Y/\partial v2$, $\partial Y/\partial v3$; where v1, v2, v3 are different independent parameters) are stored within matrix $\overline{X}$. For each observation set, tool perturbation data can be stored as a column in a matrix $\overline{X}$ and process performance data (i.e. Ysim-Yreal) can be stored as a column in matrix $\overline{Y}$. Hence, once the matrix $\overline{X}$ is assembled, each row represents a different perturbation observation and each column represents a different tool data parameter. Once the matrix $\overline{Y}$ is assembled, each row represents a different observation and each column represents a different process performance parameter. In general, matrix $\overline{X}$ can be an m by n matrix, and matrix $\overline{Y}$ can be an m by p matrix. Once all of the data is stored in the matrices, the data can be mean-centered and/or normalized, if desired. The process of mean-centering the data stored in a matrix column involves computing a mean value of the column elements and subtracting the mean value from each element. Moreover, the data residing in a column of the matrix can be normalized by the standard deviation of the data in the column.

In general, for multivariate analysis, the relationship between the tool data and the process performance data can be expressed as follows:

$$\overline{X}\overline{B} = \overline{Y}; \quad (1)$$

where $\overline{X}$ represents the m×n matrix described above, $\overline{B}$ represents an n×p (p<n) loading (or correlation) matrix and $\overline{Y}$ represents the m×p matrix described above. Once the data matrices $\overline{X}$ and $\overline{Y}$ are assembled, a relationship designed to best approximate the $\overline{X}$ and $\overline{Y}$ spaces and to maximize the correlation between X and Y is established using PLS analysis.

In the PLS analysis model, the matrices X and Y are decomposed as follows:

$$\overline{X} = \overline{T}\overline{P}^T + \overline{E}; \quad (2a)$$

$$\overline{Y} = \overline{U}\overline{C}^T + \overline{F}; \quad (2b)$$

and $$\overline{U} = \overline{T} + \overline{H}; \quad (2c)$$

where T is a matrix of scores that summarizes the $\overline{X}$ variables, $\overline{P}$ is a matrix of loadings for matrix $\overline{X}$, $\overline{U}$ is a matrix of scores that summarizes the $\overline{Y}$ variables, $\overline{C}$ is a matrix of weights expressing the correlation between $\overline{Y}$ and $\overline{T}$ ($\overline{X}$), and $\overline{E}$, $\overline{F}$ and $\overline{H}$ are matrices of residuals. Furthermore, in the PLS analysis model, there are additional loadings $\overline{W}$ called weights that correlate $\overline{U}$ and $\overline{X}$, and are used to calculate $\overline{T}$.

In summary, the PLS analysis geometrically corresponds to fitting a line, plane or hyper plane to both the $\overline{X}$ and $\overline{Y}$ data represented as points in a multidimensional space, with the objective of closely approximating the original data tables $\overline{X}$ and $\overline{Y}$, and maximizing the covariance between the observation positions on the hyper planes.

Figure 11:
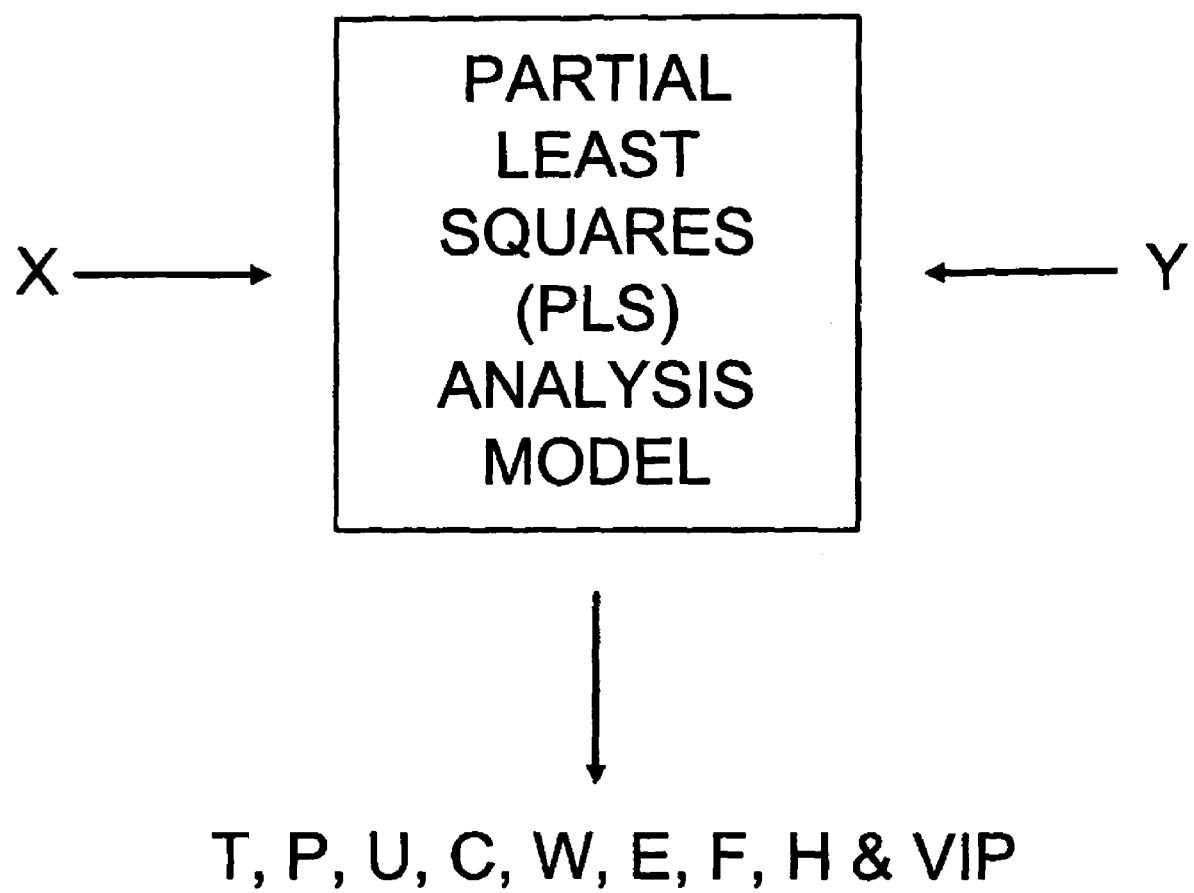
FIG. 11 is a schematic representation of the data inputs, $\overline{X}$ and $\overline{Y}$, to a PLS analysis and the corresponding outputs $\overline{T}$, $\overline{P}$, $\overline{U}$, $\overline{C}$, $\overline{W}$, $\overline{E}$, $\overline{F}$, $\overline{H}$ and variable importance in the projection (VIP)

FIG. 11 provides a schematic representation of the data inputs, $\overline{X}$ and $\overline{Y}$, to the PLS analysis and the corresponding outputs $\overline{T}, \overline{P}, \overline{U}, \overline{C}, \overline{W}, \overline{E}, \overline{F}, \overline{H}$ and variable importance in the projection (VIP). An example of a commercially available software which supports PLS analysis modeling is PLS_Toolbox offered with MATLAB (commercially available from The Mathworks, Inc., Natick, Mass.), or SIMCA-P 8.0 (commercially available from Umetrics, Kinnelon, N.J.). For instance, further details on this software are provided in the User's Manual User Guide to SIMCA-P 8.0: A new standard in multivariate data analysis is Umetrics AB, Version 8.0, which is also suitable for the present invention. Once a matrix is formulated, a matrix X is determined for each simulation result. Any difference between the simulated result and the actual result can be determined and attributed to a specific (independent) process parameter using the PLS analysis and the VIP result. For example, the maximum VIP value output from the PLS model corresponds to the process parameter most likely responsible for the difference.

Figure 12:
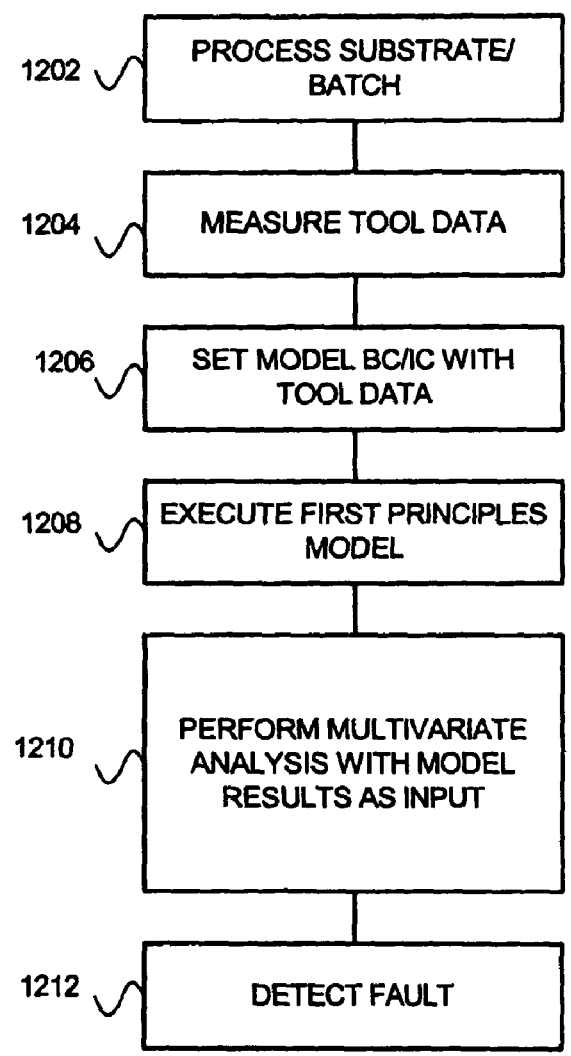
FIG. 12 is a flow chart showing a process for using first principles simulation techniques to detect a fault and control a process performed by a semiconductor processing tool in accordance with an embodiment of the present invention.

FIG. 12 is a flow chart showing a process for using first principles simulation techniques to detect a fault and control a process performed by a semiconductor processing tool in accordance with an embodiment of the present invention. The flow chart is presented beginning with step 1202 for processing a substrate or batch of substrates within a process tool, such as the process tool 1002. At step 1204, tool data is measured and provided as input to a simulation module such as simulation module 1006. Boundary conditions and initial conditions are then imposed on the physical model of the simulation module to set-up the model as shown in step 1206. At step 1208, the first principles physical model is executed to perform first principles simulation results that are output to a controller such as the APC controller 1008 of FIG. 10. At any time, for example, from run-to-run or batch-to-batch, the operator has the opportunity to select the control model to be employed within the APC controller. For example, the APC controller can utilize either the process model perturbation results, or the PCA model results. In either run-to-run or batch-to-batch, the process can be adjusted/corrected by the controller using model output. At step 1010, the process model output serves as input to the PLS model in the fault detector 1040, permitting a fault to be detected and classified at step 1012. For example, as described above, a difference between the real process performance Yreal and the simulated (or predicted) process performance for the given process condition (i.e. set of input control variables) Ysim can be utilized to determine the existence of a process fault, wherein Yreal is measured using either a physical sensor, or a metrology tool, and Ysim is determined by executing a simulation provided the input for the current process condition. If the difference (or variance, root mean square, or other statistic) between the real and simulated results exceeds a predetermined threshold, then a fault can be predicted to have occurred. The predetermined threshold can, for example, comprise a fraction of the mean value for the specific data, i.e. 5%, 10%, 15%, or it can be a multiple of a root mean square of the data, i.e. $1\sigma, 2\sigma, 3\sigma$. Once a fault is detected, it can be classified using PLS analysis. For example, a sensitivity matrix $\overline{X}$ has been determined (and, possibly, stored in library 1010) for a given input condition (i.e. set of input control variables). Either the tool perturbation data (sensitivity matrix) is determined in-situ, centered on the current model solution, or determined a priori within the n-dimensional solution space using the process model. Using the sensitivity matrix and the difference between the real and simulated results, equation (1) can be solved using PLS analysis to identify those control variables (input parameters) that exhibit the greatest correlation with the observed difference between the real and simulated results. Using the example provided above, the process performance may be summarized by a profile of static pressure across the space overlying the substrate. The real result Yreal represents the measured profile of pressure, and Ysim represents the simulated profile of pressure. Let's assume a gas flow rate is set, however, the mass flow controller doubles the flow rate (yet reports the set value). One would expect to see a difference between the simulated and measured (real) profiles of pressure; i.e. the flow rate is off by a factor of two between the real and simulated cases. The difference between the real and simulated results would be sufficiently large to exceed a pre-determined threshold. Using the PLS analysis, those parameters which tend to affect the profile in pressure the greatest would be identified, such as a gas flow rate. The presence of a fault and its characterization can be reported to an operator as process tool fault status, or can cause the APC controller to perform control of the process tool (such as shut down) in response to the fault detection.

Figure 13:
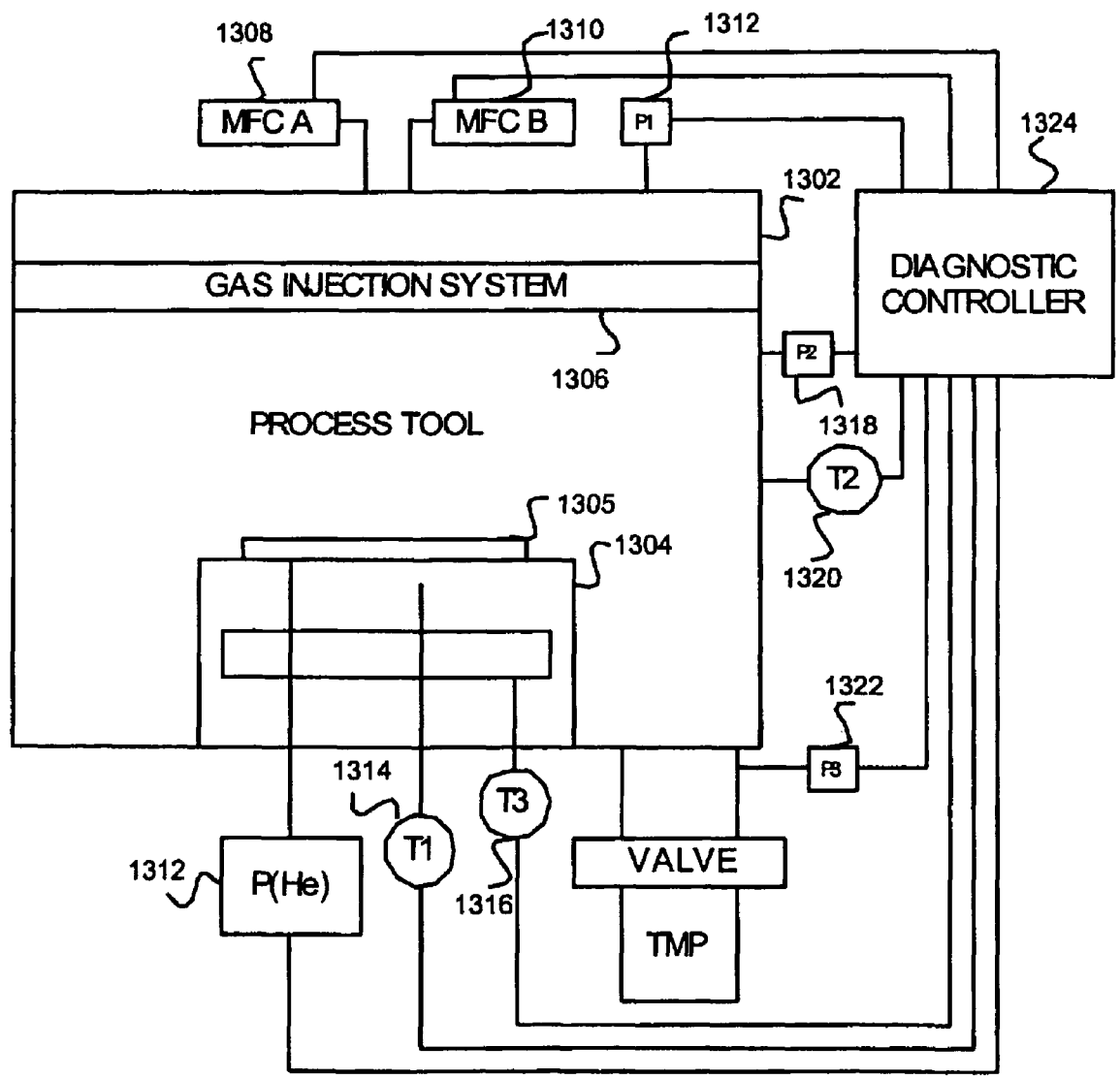
FIG. 13 is a block diagram of a vacuum processing system, to which a process control embodiment of the present invention may be applied.

FIG. 13 is a block diagram of a vacuum processing system, to which a process control embodiment of the present invention may be applied. The vacuum processing system depicted in FIG. 13 is provided for illustrative purposes and does not limit the scope of the present invention in any way. The vacuum processing system includes a process tool 1302 having a substrate holder 1304 for supporting a substrate 1305, a gas injection system 1306, and a vacuum pumping system. The gas injection system 1306 can include a gas inject plate, a gas injection plenum, and one or more gas injection baffle plates within the gas injection plenum. The gas injection plenum can be coupled to one or more gas supplies such as gas A and gas B, wherein the mass flow rate of gas A and gas B into the processing system is affected by two mass flow controllers MFCA 1308 and MFCB 1310. Furthermore, a pressure sensor 1312 for measuring a pressure P1 can be coupled to the gas injection plenum. The substrate holder can, for example, include a plurality of components including but not limited to a helium gas supply for improving the gas-gap thermal conductance between the substrate and the substrate holder, an electrostatic clamping system, temperature control elements including cooling elements and heating elements, and lift pins for lifting the substrate to and from the surface of the substrate holder. Additionally, the substrate holder can include a temperature sensor 1314 for measuring the substrate holder temperature (T1) or substrate temperature, and a temperature sensor 1316 for measuring the coolant temperature (T3). As described above, helium gas is supplied to the backside of the substrate, wherein the gas-gap pressure (P(He)) can be varied at one or more locations. Furthermore, another pressure sensor 1318 can be coupled to the process tool to measure chamber pressure (P2), another temperature sensor 1320 can be coupled to the process tool to measure a surface temperature (T2), and another pressure sensor 1322 can be coupled to the inlet of the vacuum pumping system to measure an inlet pressure (P3).

A diagnostic controller 1324 can be coupled to each of the sensors described above and can be configured to provide measurements from these sensors to the simulation module described above. For the exemplary system of FIG. 13, the model executed on the simulation module can, for example, include three components, namely, a thermal component, a gas dynamic component, and a chemistry component. In the first component, the gas-gap pressure field can be determined, followed by a calculation of the gas-gap thermal conductance. Thereafter, the spatially resolved temperature field for the substrate (and substrate holder) can be determined by properly setting boundary conditions (and internal conditions) such as boundary temperature, or boundary heat flux, power deposited in resistance heating elements, power removed in cooling elements, heat flux at substrate surface due to the presence of plasma, etc.

In one example of the present invention, ANSYS is utilized to compute the temperature field. Utilizing the second component of the process model, (i.e. the gas dynamic component), the gas pressure field and velocity field can be determined using the surface temperatures computed in the thermal component, and several of the aforementioned measurements. For example, the mass flow rate and pressure (P1) can be utilized to determine an inlet condition, and the pressure (P3) can be utilized to determine an outlet condition, and CFD-ACE+ can be utilized to compute the gas pressure and velocity fields. Utilizing the chemistry model (i.e., the third component), the previously computed velocity, pressure, and temperature fields can be utilized as inputs to a chemistry model to compute, for example, an etch rate. Depending on the complexity of the process tool geometry, each of these model components can be executed on a time scale within a batch-to-batch process cycle. Any one of these components can, for example, be utilized to provide spatial uniformity data as input to the process control, methodology, process characterization, and/or fault detection/classification.

From the derived models and analysis of the process in response to changes in processing conditions and/or effects such as reactor aging, an empirical model can be assimilated over time. As such, when the number of repetitions on the reactor becomes statistically significant as determined by standard statistical analysis programs, the process control evolves to a control which is empirically based for those processes which are essentially "repeats" of previously run operations. Yet, according to the present invention, the process control returns the capability to perform first-principles simulation if necessary to accommodate new processes or alterations in the process geometry.

FIG. 14 illustrates a computer system 1401 upon which an embodiment of the present invention may be implemented. The computer system 1401 may be used as the first principles simulation processor 108 to perform any or all of the functions of the first principles simulation processor described above, or may be used as any other device, or to perform any process step described with respect to FIGS. 1-13. The computer system 1401 includes a bus 1402 or other communication mechanism for communicating information, and a processor 1403 coupled with the bus 1402 for processing the information. The computer system 1401 also includes a main memory 1404, such as a random access memory (RAM) or other dynamic storage device (e.g., dynamic RAM (DRAM), static RAM (SRAM), and synchronous DRAM (SDRAM)), coupled to the bus 1402 for storing information and instructions to be executed by processor 1403. In addition, the main memory 1404 may be used for storing temporary variables or other intermediate information during the execution of instructions by the processor 1403. The computer system 1401 further includes a read only memory (ROM) 1405 or other static storage device (e.g., programmable ROM (PROM), erasable PROM (EPROM), and electrically erasable PROM (EEPROM)) coupled to the bus 1402 for storing static information and instructions for the processor 1403.

The computer system 1401 also includes a disk controller 1406 coupled to the bus 1402 to control one or more storage devices for storing information and instructions, such as a magnetic hard disk 1407, and a removable media drive 1408 (e.g., floppy disk drive, read-only compact disc drive, read/write compact disc drive, compact disc jukebox, tape drive, and removable magneto-optical drive). The storage devices may be added to the computer system 1401 using an appropriate device interface (e.g., small computer system interface (SCSI), integrated device electronics (IDE), enhanced-IDE (E-IDE), direct memory access (DMA), or ultra-DMA).

The computer system 1401 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1401 may also include a display controller 1409 coupled to the bus 1402 to control a display 1410, such as a cathode ray tube (CRT), for displaying information to a computer user. The computer system includes input devices, such as a keyboard 1411 and a pointing device 1412, for interacting with a computer user and providing information to the processor 1403. The pointing device 1412, for example, may be a mouse, a trackball, or a pointing stick for communicating direction information and command selections to the processor 1403 and for controlling cursor movement on the display 1410. In addition, a printer may provide printed listings of data stored and/or generated by the computer system 1401.

The computer system 1401 performs a portion or all of the processing steps of the invention in response to the processor 1403 executing one or more sequences of one or more instructions contained in a memory, such as the main memory 1404. Such instructions may be read into the main memory 1404 from another computer readable medium, such as a hard disk 1407 or a removable media drive 1408. One or more processors in a multi-processing arrangement may also be employed to execute the sequences of instructions contained in main memory 1404. In alternative embodiments, hard-wired circuitry may be used in place of or in combination with software instructions. Thus, embodiments are not limited to any specific combination of hardware circuitry and software.

As stated above, the computer system 1401 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer system 1401, for driving a device or devices for implementing the invention, and for enabling the computer system 1401 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs. Moreover, parts of the processing of the present invention may be distributed for better performance, reliability, and/or cost.

The term "computer readable medium" as used herein refers to any medium that participates in providing instructions to the processor 1403 for execution. A computer readable medium may take many forms, including but not limited to, non-volatile media, volatile media, and transmission media. Non-volatile media includes, for example, optical, magnetic disks, and magneto-optical disks, such as the hard disk 1407 or the removable media drive 1408. Volatile media includes dynamic memory, such as the main memory 1404. Transmission media includes coaxial cables, copper wire and fiber optics, including the wires that make up the bus 1402. Transmission media also may also take the form of acoustic or light waves, such as those generated during radio wave and infrared data communications.

Various forms of computer readable media may be involved in carrying out one or more sequences of one or more instructions to processor 1403 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer system 1401 may receive the data on the telephone line and use an infrared transmitter to convert the data to an infrared signal. An infrared detector coupled to the bus 1402 can receive the data carried in the infrared signal and place the data on the bus 1402. The bus 1402 carries the data to the main memory 1404, from which the processor 1403 retrieves and executes the instructions. The instructions received by the main memory 1404 may optionally be stored on storage device 1407 or 1408 either before or after execution by processor 1403.

The computer system 1401 also includes a communication interface 1413 coupled to the bus 1402. The communication interface 1413 provides a two-way data communication coupling to a network link 1414 that is connected to, for example, a local area network (LAN) 1415, or to another communications network 1416 such as the Internet. For example, the communication interface 1413 may be a network interface card to attach to any packet switched LAN. As another example, the communication interface 1413 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1413 sends and receives electrical, electromagnetic or optical signals that carry digital data streams representing various types of information.

The network link 1414 typically provides data communication through one or more networks to other data devices. For example, the network link 1414 may provide a connection to another computer through a local network 1415 (e.g., a LAN) or through equipment operated by a service provider, which provides communication services through a communications network 1416. The local network 1414 and the communications network 1416 use, for example, electrical, electromagnetic, or optical signals that carry digital data streams, and the associated physical layer (e.g., CAT 5 cable, coaxial cable, optical fiber, etc). The signals through the various networks and the signals on the network link 1414 and through the communication interface 1413, which carry the digital data to and from the computer system 1401 maybe implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1401 can transmit and receive data, including program code, through the network(s) 1415 and 1416, the network link 1414, and the communication interface 1413. Moreover, the network link 1414 may provide a connection through a LAN 1415 to a mobile device 1417 such as a personal digital assistant (PDA) laptop computer, or cellular telephone.

Numerous modifications and variations of the present invention are possible in light of the above teachings. It is therefore to be understood that within the scope of the appended claims, the invention may be practiced otherwise than as specifically described herein. For example, the process steps described herein and recited in the claims may be performed simultaneously or in a sequence other than the sequence in which they are described or listed herein. As should be understood by one of ordinary skill in the art, only those process steps necessary to the performance of a later process steps are required to be performed before the later process step is performed.

The invention claimed is:

1. A method of facilitating a process performed by a semiconductor processing tool, comprising:
   inputting a first principles physical model including a set of computer-encoded differential equations, the first principles physical model describing at least one of a basic physical or chemical attribute of the semiconductor processing tool and including 1) a spatially resolved model of a physical geometry of the semiconductor processing tool and 2) a grid set addressing the semiconductor processing tool or a geometry of the semiconductor processing tool;
   inputting process data related to an actual process being performed by the semiconductor processing tool;
   setting boundary conditions for the spatially resolved model of the physical geometry of the semiconductor processing tool based on said process data related to the actual process being performed by the semiconductor processing tool;
   storing in a fab-level library known simulation results obtained from simulation modules in a device manufacturing fab and distributing the known simulation results to other semiconductor processing tools in the device manufacturing fab;
   solving the computer-encoded differential equations of the first principles physical model for the spatially resolved model concurrently with the actual process being performed and in a time frame shorter in time than the actual process being performed to produce a first principles simulation by:
      using code parallelization techniques on multiple simulation modules in the device manufacturing fab, and
      re-using known simulation solutions as initial conditions for the first principles simulation,
      wherein re-using known simulation solutions comprises searching in the fab-level library for a closest fitting solution which if used for the initial condition would reduce the number of iterations required by the simulation module;
   providing from the solution of the computer-encoded differential equations solved concurrently with the actual process being performed a first principles simulation result; and
   using the first principles simulation result obtained during the performance of the actual process to facilitate the actual process being performed by the semiconductor processing tool.

2. The method of claim 1, wherein said inputting process data comprises directly inputting the data relating to the actual process being performed by the semiconductor processing tool from at least one of a physical sensor and a metrology tool physically mounted on the semiconductor processing tool.

3. The method of claim 1, wherein said inputting process data comprises indirectly inputting the data relating to the actual process being performed by the semiconductor processing tool from at least one of a manual input device and a database.

4. The method of claim 3, wherein said indirectly inputting comprises inputting data recorded from a process previously performed by the semiconductor processing tool.

5. The method of claim 3, wherein said indirectly inputting comprises inputting data set by a simulation operator.

6. The method of claim 1, wherein said inputting process data comprises inputting data relating to at least one of the physical characteristics of the semiconductor processing tool and the semiconductor tool environment.

7. The method of claim 1, wherein said inputting process data comprises inputting data relating to at least one of a characteristic and a result of a process performed by the semiconductor processing tool.

8. The method of claim 1, wherein said inputting a first principles physical model comprises inputting fundamental equations necessary to perform first principles simulation for a desired simulation result.

9. The method of claim 1, further comprising using a network of interconnected resources inside a semiconductor device manufacturing facility to perform the first principles simulation recited in claim 1.

10. The method of claim 9, further comprising using code parallelization among interconnected computational resources to share the computational load of the first principles simulation.

11. The method of claim 9, further comprising sharing simulation information among interconnected resources to facilitate a process performed by the semiconductor processing tool.

12. The method of claim 11, wherein said sharing simulation information comprises distributing simulation results among the interconnected resources to reduce redundant execution of substantially similar first principles simulations by different resources.

13. The method of claim 11, wherein said sharing simulation information comprises distributing model changes among the interconnected resources to reduce redundant refinements of first principles simulations by different resources.

14. The method of claim 1, further comprising using remote resources via a wide area network to facilitate the semiconductor process performed by the semiconductor processing tool.

15. The method of claim 14, wherein said using remote resources comprises using at least one of remote computational and storage resources via a wide area network to facilitate the semiconductor process performed by the semiconductor processing tool.

16. A system comprising:
a semiconductor processing tool configured to perform a process;
a fab-level library storing known simulation results obtained from simulation modules in a device manufacturing fab;
a fab-level process controller distributing the known simulation results to other semiconductor processing tools in the device manufacturing fab;
a first principles simulation processor configured to input a first principles physical model including a set of computer-encoded differential equations describing at least one of a basic physical or chemical attribute of the semiconductor processing tool and including 1) a spatially resolved model of a physical geometry of the semiconductor processing tool and 2) a grid set addressing the semiconductor processing tool or a geometry of the semiconductor processing tool;
an input device configured to input process data related to an actual process being performed by the semiconductor processing tool; and
said first principles simulation processor further configured to:
set boundary conditions for the spatially resolved model of the physical geometry of the semiconductor processing tool based on said process data related to the actual process being performed by the semiconductor processing tool,
solve the computer-encoded differential equations of the first principles physical model for the spatially resolved model concurrently with the actual process being performed and in a time frame shorter in time than the actual process being performed to produce a first principles simulation by:
using code parallelization techniques on multiple simulation modules in the device manufacturing fab, and
re-using known simulation solutions as initial conditions for the first principles simulation,
wherein re-using known simulation solutions comprises searching in the fab-level library for a closest fitting solution which if used for the initial condition would reduce the number of iterations required by the simulation module, and
provide from the solution of the computer-encoded differential equations solved concurrently with the actual process being performed a first principles simulation result,
wherein said first principles simulation result obtained during the performance of the actual process is used to facilitate the actual process being performed by the semiconductor processing tool.

17. The system of claim 16, wherein said input device comprises at least one of a physical sensor and a metrology tool physically mounted on the semiconductor processing tool.

18. The system of claim 16, wherein said input device comprises at least one of a manual input device and a database.

19. The system of claim 18, wherein said input device is configured to input data recorded from a process previously performed by the semiconductor processing tool.

20. The system of claim 18, wherein said input device is configured to input data set by a simulation operator.

21. The system of claim 16, wherein said input device is configured to input data relating to at least one of the physical characteristics of the semiconductor processing tool and the semiconductor tool environment.

22. The system of claim 16, wherein said input device is configured to input data relating to at least one of a characteristic and a result of a process performed by the semiconductor processing tool.

23. The system of claim 16, wherein said processor is configured to input a first principles physical model comprising fundamental equations necessary to perform first principles simulation for a desired simulation result.

24. The system of claim 16, further comprising a network of interconnected resources inside a semiconductor device manufacturing facility and connected to said processor and configured to assist said processor in performing at least one of the inputting a first principles simulation model and performing a first principles simulation.

25. The system of claim 24, wherein said network of interconnected resources is configured to use code parallelization with said processor to share the computational load of the first principles simulation.

26. The system of claim 24, wherein said network of interconnected resources is configured to share simulation information with said processor to facilitate said process performed by the semiconductor processing tool.

27. The system of claim 26, wherein said network of interconnected resources is configured to distribute simulation results to said processor to reduce redundant execution of substantially similar first principles simulations.

28. The system of claim 26, wherein said network of interconnected resources is configured to distribute model changes to said processor to reduce redundant refinements of first principles simulations.

29. The system of claim 16, further comprising remote resources connected to said processor via a wide area network and configured to facilitate the semiconductor process performed by the semiconductor processing tool.

30. The system of claim 29, wherein said remote resources comprise at least one of a computational and a storage resource.

31. At least one of non-volatile media and volatile media containing program instructions for execution on a processor, which when executed by the computer system, cause the processor to perform the steps of:
inputting a first principles physical model including a set of computer-encoded differential equations, the first principles physical model describing at least one of a basic physical or chemical attribute of the semiconductor processing tool and including 1) a spatially resolved model of a physical geometry of the semiconductor processing tool and 2) a grid set addressing the semiconductor processing tool or a geometry of the semiconductor processing tool;
inputting process data related to an actual process being performed by the semiconductor processing tool;
setting boundary conditions for the spatially resolved model of the physical geometry of the semiconductor processing tool based on said process data related to the actual process being performed by the semiconductor processing tool;
storing in a fab-level library known simulation results obtained from simulation modules in a device manufacturing fab and distributing the known simulation results to other semiconductor processing tools in the device manufacturing fab;
solving the computer-encoded differential equations of the first principles physical model for the spatially resolved model concurrently with the actual process being performed and in a time frame shorter in time than the actual process being performed to produce a first principles simulation by:

using code parallelization techniques on multiple simulation modules in the device manufacturing fab, and re-using known simulation solutions as initial conditions for the first principles simulation, wherein re-using known simulation solutions comprises searching in the fab-level library for a closest fitting solution which if used for the initial condition would reduce the number of iterations required by the simulation module;

providing from the solution of the computer-encoded differential equations solved concurrently with the actual process being performed a first principles simulation result; and using the first principles simulation result obtained during the performance of the actual process to facilitate the actual process being performed by the semiconductor processing tool.

* * * * *